United States Patent [19]

Blakeney, II et al.

[11] Patent Number: 5,490,165
[45] Date of Patent: Feb. 6, 1996

[54] DEMODULATION ELEMENT ASSIGNMENT IN A SYSTEM CAPABLE OF RECEIVING MULTIPLE SIGNALS

[75] Inventors: Robert D. Blakeney, II, San Diego, Calif.; Lindsay A. Weaver, Jr., Boulder, Colo.; Noam A. Ziv, San Diego, Calif.; Paul T. Williamson, San Diego, Calif.; Roberto Padovani, San Diego, Calif.

[73] Assignee: Qualcomm Incorporated, San Diego, Calif.

[21] Appl. No.: 144,902

[22] Filed: Oct. 28, 1993

[51] Int. Cl.⁶ ................................................. H04B 1/69
[52] U.S. Cl. ........................ 375/205; 375/208; 375/267
[58] Field of Search ................................ 375/1, 107, 205, 375/208, 210, 267; 455/3.2, 65, 276.1, 279.1

[56] References Cited

U.S. PATENT DOCUMENTS

| | | | |
|---|---|---|---|
| 5,056,109 | 10/1991 | Gilhousen et al. | 375/1 |
| 5,101,501 | 3/1992 | Gilhousen et al. | 375/1 |
| 5,267,261 | 11/1993 | Blakeney, II et al. | 375/1 |
| 5,280,472 | 1/1994 | Gilhousen et al. | 375/1 |
| 5,303,219 | 1/1995 | Wheatley, II et al. | 375/205 |
| 5,303,393 | 4/1994 | Noreen et al. | 455/3.2 |
| 5,327,467 | 7/1994 | De Gaudenzi et al. | 375/107 |
| 5,437,055 | 7/1995 | Wheatley, II et al. | 455/65 |

Primary Examiner—Salvatore Cangialosi
Attorney, Agent, or Firm—Russell B. Miller; Brian S. Edmonston

[57] ABSTRACT

In a receiver having a plurality of demodulation elements, a method of assigning the plurality of demodulation element so a set of available signals. A first method emphasizes diversity of transmitting devices so that power control is optimal. A second method emphasizes the maximum signal strength available to produce aggregate maximum signal strength. Both methods control the number of reassignments so that excessive data is not lost during the reassignment process. The apparatus comprises the plurality of demodulation elements, at least one searcher element, and a controller.

59 Claims, 16 Drawing Sheets

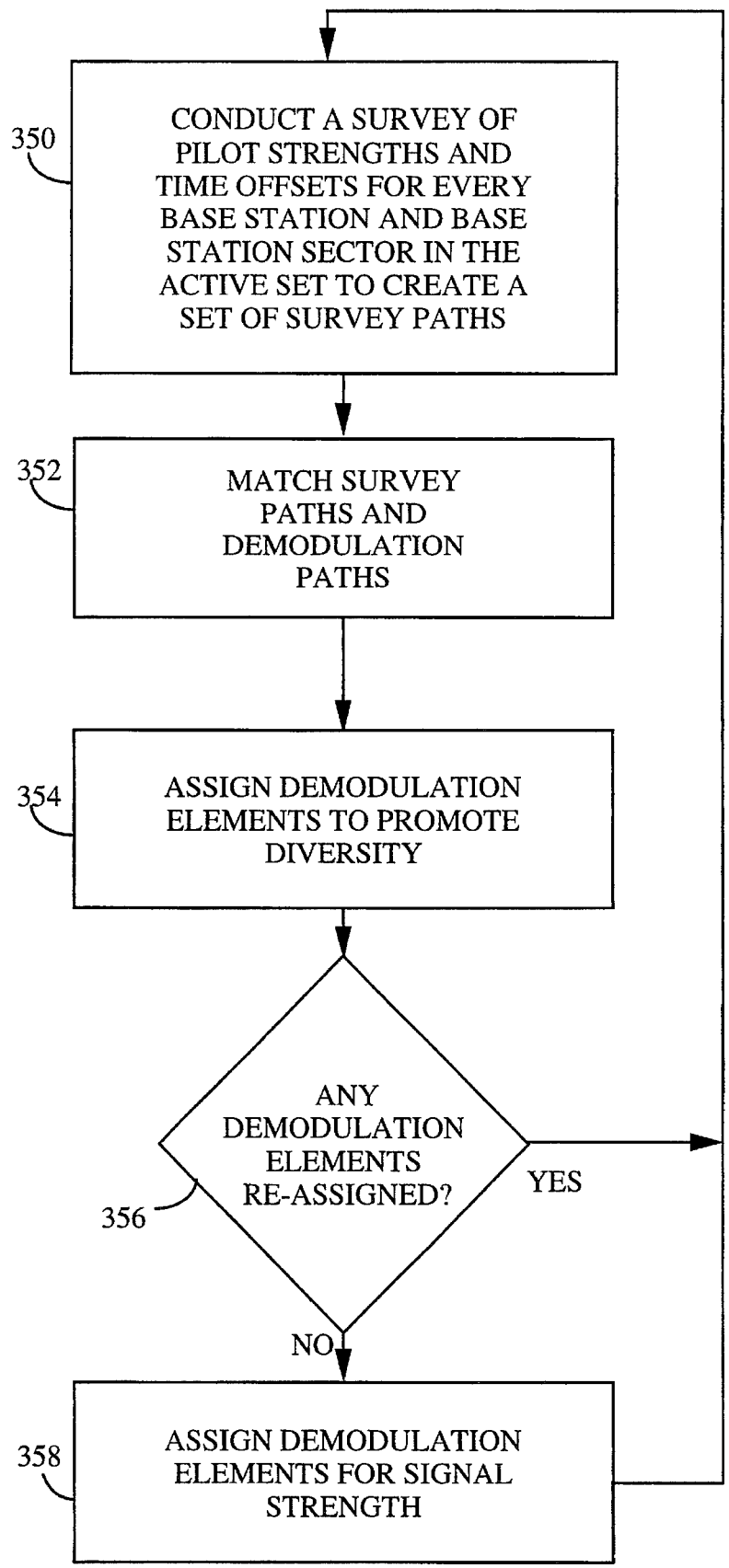

DEMODULATION ELEMENT ASSIGNMENT IN A SYSTEM CAPABLE OF RECEIVING MULTIPLE SIGNALS

BACKGROUND OF THE INVENTION

I. Field of the Invention

The present invention relates to communication systems, particularly to a demodulation element assignment method for a communication system capable of receiving multiple signals.

II. Description of the Related Art

In a code division multiple access (CDMA) cellular telephone system, a common frequency band is used for communication with all base stations in a system. The common frequency band allows simultaneously communication between a mobile station and more than one base station. Signals occupying the common frequency band are discriminated at the receiving station through the spread spectrum CDMA waveform properties based on the use of a high speed pseudonoise (PN) code. The high speed PN code is used to modulate signals transmitted from the base stations and the mobile stations. Transmitter stations using different PN codes or PN codes that are offset in time produce signals that can be separately received at the receiving station. The high speed PN modulation also allows the receiving station to receive a signal from a single transmitting station where the signal has traveled over several distinct propagation paths.

A signal having traveled several distinct propagation paths is generated by the multipath characteristics of the cellular channel. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the mobile radio channel, the multipath is created by reflection of the signal from obstacles in the environment, such as buildings, trees, cars, and people. In general the mobile radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse was transmitted.

The multipath characteristic of a channel can result in signal fading. Fading is the result of the phasing characteristics of the multipath channel. A fade occurs when multipath vectors are added destructively, yielding a received signal that is smaller than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal would be received at the output of the channel.

In narrow band modulation systems such as the analog FM modulation employed by conventional radio telephone systems, the existence of multiple path in the radio channel results in severe multipath fading. As noted above with a wideband CDMA, however, the different paths may be discriminated in the demodulation process. This discrimination not only greatly reduces the severity of multipath fading but provides an advantage to the CDMA system.

The deleterious effects of fading can be mitigated by controlling transmitter power in the CDMA system. A system for base station and mobile station power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention. Furthermore the effect of multipath fading can be reduced communication with multiple base stations using a soft handoff process. A handoff process is disclosed in U.S. Pat. No. 5,101,501 entitled "SOFT HANDOFF IN A CDMA CELLULAR TELEPHONE SYSTEM," issued Oct. 8, 1991, and assigned to the Assignee of the present invention.

In a cellular telephone system, maximizing the capacity of the system in terms of the number of simultaneous telephone calls that can be handled is extremely important. System capacity in a spread spectrum system can be maximized if the transmitter power of each mobile station is controlled such that each transmitted signal arrives at the base station receiver at the same level. In an actual system, each mobile station may transmit the minimum signal level that produces a signal-to-noise ratio that allows acceptable data recovery. If a signal transmitted by a mobile station arrives at the base station receiver at a power level that is too low, the bit-error-rate may be too high to permit high quality communications due to interference from the other mobile stations. On the other hand, if the mobile station transmitted signal is at a power level that is too high when received at the base station, communication with this particular mobile station is acceptable but this high power signal acts as interference to other mobile stations. This interference may adversely affect communications with other mobile stations.

Therefore to maximize capacity in an exemplary CDMA spread spectrum system, the transmit power of each mobile station within the coverage area of a base station is controlled by the base station to produce the same nominal received signal power at the base station. In the ideal case, the total signal power received at the base station is equal to the nominal power received from each mobile station multiplied by the number of mobile stations transmitting within the coverage area of the base station plus the power received at the base station from mobile stations in the coverage area of neighboring base stations.

The path loss in the mobile radio channel can be characterized by two separate phenomena: average path loss and fading. The forward link, from the base station to the mobile station, operates on a different frequency than the reverse link, from the mobile station to the base station. However because the forward link and reverse link frequencies are within the same frequency band, a significant correlation between the average path loss of the two links exists. On the other hand, fading is an independent phenomenon for the forward link and reverse link and varies as a function of time.

In an exemplary CDMA system, each mobile station estimates the path loss of forward link based on the total power at the input to the mobile station. The total power is the sum of the power from all base stations operating on the same frequency assignment as perceived by the mobile station. From the estimate of the forward link path loss averaged over time, the mobile station sets the transmit level of the reverse link signal. Should the reverse link channel for one mobile station suddenly improve compared to the forward link channel for the same mobile station due to independent fading of the two channels, the signal as received at the base station from this mobile station would increase in power. This increase in power causes additional interference to all signals sharing the same frequency assignment. Thus a rapid response of the mobile station transmit power to the sudden improvement in the channel would improve system performance.

Mobile station transmit power is also controlled by one or more base stations. Each base station with which the mobile unit is in communication measures the received signal strength from the mobile unit. The measured signal strength is compared to a desired signal strength level for that particular mobile station. A power adjustment command is generated by each base station and sent to the mobile unit on the forward link. In response to the base station power adjustment command, the mobile unit increases or decreases the mobile unit transmit power by a predetermined amount. By this method, a rapid response to a change in the channel is effected and the average system performance is improved.

When a mobile station is in communication with more than one base station, power adjustment commands are provided from each base station. The mobile station acts upon these multiple base station power control commands to avoid transmit power levels that may adversely interfere with other mobile station communications and yet provide sufficient power to support communication from the mobile station to at least one of the base stations. This power control mechanism is accomplished by having the mobile station increase its transmit signal level only if every base station with which the mobile station is in communication requests an increase in power level. The mobile station decreases its transmit signal level if any base station with which the mobile station is in communication requests that the power be decreased.

The existence of multipath can provide path diversity to a wideband spread spectrum system. A spread spectrum system generates a spread information signal by modulating an information signal with a pseudonoise (PN) code. Generally the PN code runs at many times the rate of the information signal. The rate that the PN code is generated is called the chip rate and the duration of one data bit of the PN code is called the chip time. If two or more paths are available with greater than chip time differential path delay, two or more processing elements, called demodulation elements, can be employed to separately demodulate these signals. These signals typically exhibit independence in multipath fading, i.e., they do not usually fade together. Therefore the output of the two or more demodulation elements can be combined to obtain path diversity. A loss of signal occurs only when the signals from all demodulation elements experience a fade at the same time. In an ideal system, both the base station and the mobile station employ multiple demodulation elements.

As a mobile station moves through the physical environment, the number of signal paths and the strength of the signals on these paths vary constantly, both as received at the mobile station and as received at the base station. Therefore, a receiver incorporating the present invention uses a special processing element, called a searcher element, that continually scans the channel in the time domain to determine the existence, time offset, and the signal strength of signals in the multiple path environment. The output of the searcher element provides the information for ensuring that the demodulation elements are tracking the most advantageous paths. The present invention provides a method of assigning the multiple demodulation elements to the multiple received signals based on the searcher element information.

In an exemplary CDMA cellular telephone system, each base station transmits a spread spectrum "pilot" reference signal. This pilot signal is used by the mobile stations to obtain initial system synchronization and to provide robust time, frequency, and phase tracking of the base station transmitted signals. The pilot signal transmitted by each base station in a system may use the same PN code but with a different code phase offset meaning that the PN codes transmitted by neighboring base stations are identical but skewed in time with respect to one another. Phase offset allows the pilot signals to be distinguished from one another according to the base station from which they originate. The mobile station's searcher element continues to scan the received signal at the code offsets corresponding to neighboring base station's transmitted pilot signals while in the call inactive mode. When a call is initiated, a PN code address is determined for use during this call. The code address may be either assigned by the base station or be determined by prearrangement based upon the identity of the mobile station. After a call is initiated the mobile station's searcher element continues to scan the pilot signal transmitted by neighboring base stations. When the pilot signal transmitted by a neighboring base station becomes strong enough to establish communication, the mobile station generates and transmits a control message to the base station currently servicing the call. The current base station provides the control message to the cellular system controller.

The cellular system controller begins the base station diversity or so-called "soft handoff" process. The cellular system controller begins by assigning a modem located in the new base station to the call. This modem is given the PN address associated with the call between the mobile station and the current base station modem. The new base station modem assigned to service the call searches for and finds the mobile station transmitted signal. The new base station modem also begins transmitting a forward link signal to the mobile station. The mobile station's searcher element searches for this forward link signal according to the signal information provided by the old base station. When the mobile station acquires the new base station modem transmitted signal, the mobile station may continue to communicate through the two base stations. Another base station could be added in the same manner as the first new base station above. In this case the mobile station may continue to communicate through three base stations. This process can continue until the mobile station is in communication with one base station for each demodulation element that the mobile station contains and beyond.

Diversity combining in the mobile station significantly advances the quality and reliability of communications in a cellular telephone system. A form of maximal ratio combining may be used to increase the benefit in which the signal-to-noise ratio is determined for each path. Each path may then be combined with the contributions from the other paths weighted according to the signal-to-noise ratio. Combining may be coherent because pilot signal demodulation allows the phase of each path to be determined.

In the path from the mobile station to the base station, path diversity reception is obtained in a similar manner. A base station may contain an analogous set of processing elements as the mobile station in that a searcher element may provide data to assign a plurality of demodulation elements. The present invention defines a method for assigning the demodulation elements to the multipath signals in the base station.

During communication with an end user, the demodulated data signals of a base stations are forwarded to the cellular system controller along with an indication of signal quality. The cellular system controller relays these signals to the end user. When a mobile station is in a base station diversity mode with two independent base stations, the demodulated data signals of both base stations are forwarded to the cellular system controller along with an indication of signal quality. The cellular system controller then combines the two versions of the mobile station signal or selects the signal with the best quality indication. An alternative system configuration may transmit the undecoded or even the undemodulated signals to the cellular system controller to allow a better diversity combining process to be used.

A typical base station configuration may contain multiple sectors. A multi-sectored base station comprises multiple independent transmit and receive antennas. When a mobile station is in base station diversity mode and communicating with two sectors of the same base station, the demodulated data signals of both sectors are available for combination within the base station before the signals are passed to the cellular system controller. In fact, within a multi-sector base station, a system may be configured such that each demodulation element may be assigned to any arriving signal regardless of the sector that signal was received from. This system configuration allows a process called softer handoff and the present invention defines a method for assigning the demodulation elements for this configuration.

It is therefore the object of the present invention to provide a method of assigning multiple demodulation elements in a mobile station.

It is another object of the present invention to provide a method of assigning multiple demodulation elements in a base station.

SUMMARY OF THE INVENTION

The present invention defines a method for assigning multiple demodulation elements in a spread spectrum system. In the present invention within the mobile station, a searcher element performs a survey in which it scans a window of time offsets around nominal arrival time of each signal of each base station with which active communication is established. Each survey yields a list of survey paths that comprises pilot signal strengths, time offsets, and corresponding base station pilot offset. The searcher element passes the information to a controller. The controller attempts to match the time offset of each survey path to the time offset of paths currently being demodulated by the demodulation elements. If there are multiple demodulation paths that match one survey path, all demodulation elements assigned to that path, except the demodulation element having the strongest signal strength indication, are labeled "free." If a demodulation path exists that does not correspond to a survey path, a survey path entry based on the demodulation path information is added to the list of survey paths.

Next the controller considers the survey paths in order of signal strength with the strongest signal strength survey path being first. If there is no demodulation element assigned to any path in the corresponding sector of the survey path under consideration, the controller attempts to assign a demodulation element to the survey path in the following order. If there is an unassigned or labeled "free" demodulation element, the demodulation element is assigned to the survey path. If no demodulation element is free, the demodulation element having the weakest path that is not the only demodulation path from its base station sector, if any, is re-assigned to the survey path. Finally if the first two cases fail to assign a demodulation element to the survey path, a demodulation element assigned to the weakest path is re-assigned to the survey path if the survey path's signal strength is stronger than the signal strength of the weakest demodulation path. This process continues until one re-assignment occurs or until the last criteria fails to re-assign a demodulation element to the survey path under consideration.

If none of the above rules re-assign a demodulation element for the present survey, the controller considers the survey paths again in order of signal strength with the strongest signal strength survey path being first. If the survey path is not currently assigned to a demodulation element, the controller may assign any unassigned or labeled "free" demodulation element to the survey path under consideration. If there are no unassigned or labeled "free" demodulation elements, the controller may also re-assign a demodulation element that is assigned to the same base station sector as a survey path if the survey path is stronger than the demodulation path. The controller may also re-assign the weakest demodulation element that is assigned to any base station sector having two or more assigned demodulation elements if the survey path is stronger than the demodulation path. Once either of the two above rules causes a re-assignment or both of the above rules for re-assignment fail for the survey path under consideration, the process begins again.

The present invention uses these steps to ensure base station and sector diversity. Each time a demodulation element is re-assigned, a finite time lapses in which no data is demodulated. Therefore, the present invention limits the number of demodulation element re-assignments per survey. Comparison ratios are used to create hysteresis in the assignments and thus reduce excessive re-assignment of demodulation elements.

The base station uses a similar but less complicated method to assign the demodulation elements. Because each base station sector receives the same information from a single mobile station, there is no need to sacrifice the maximum signal level paths to promote diversity. Thus the base station method is based more strictly on signal level while limiting the number of re-assignments per survey similar to the mobile station method. The base station also uses ratios similar to the mobile station to create hysteresis to reduce excessive re-assignment of demodulation elements.

BRIEF DESCRIPTION OF THE DRAWINGS

The features, objects, and advantages of the present invention will become more apparent from the detailed description set forth below when taken in conjunction with the drawings in which like reference characters correspond throughout and wherein:

FIG. 4 is a summary of the demodulation element assignment method for a mobile station according to the present invention;

DETAILED DESCRIPTION OF THE PREFERRED EMBODIMENTS

The present invention defines a method for assigning multiple demodulation elements in a spread spectrum system. Two methods are developed herein: one directed toward base station operation, and one directed toward mobile station operation. Both algorithms are developed by presenting specific implementations that illustrate the general principles of the present invention.

Figure 1:
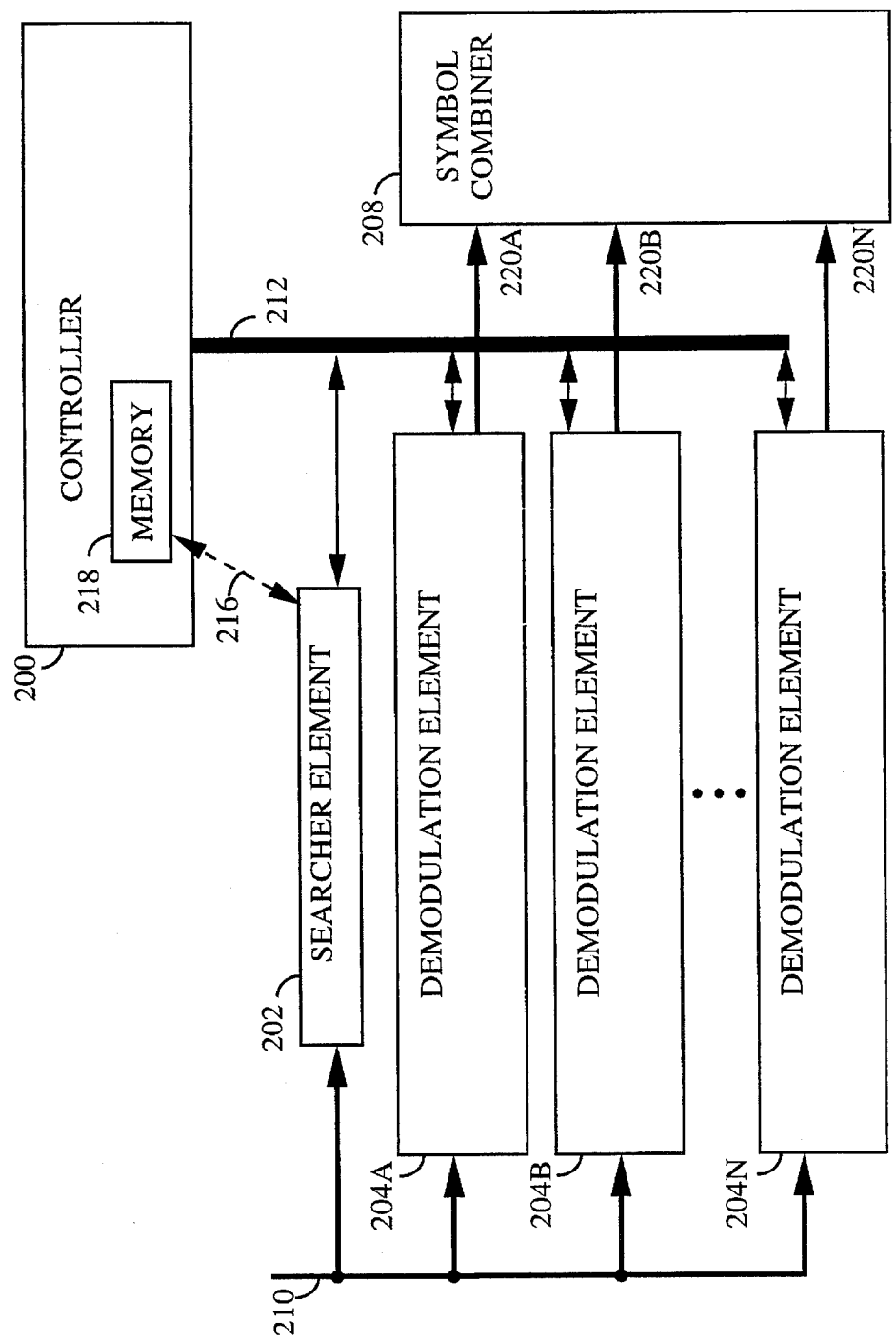
FIG. 1 is an illustration of an exemplary mobile station comprising multiple independent demodulation elements.

The method used by the mobile station assumes that the mobile station comprises multiple independent demodulation elements. FIG. 1 illustrates an exemplary embodiment of such a mobile station. The elements are controlled by controller 200 through interconnection 212. Input signal 210 supplies the signal received by the mobile station that has been RF/analog processed to searcher element 202 and demodulation elements 204A–204N. Searcher element 202 continually scans the time domain searching for pilot signals from nearby base stations. Searcher element 202 also scans a set of time offsets around the nominal arrival of the signal from each base station in search of multipath signals that have developed.

Searcher element 202 passes the developed data to controller 200. Searcher element 202 may pass data through interconnection 212. Alternatively, searcher element 212 may pass data to controller 200 through direct memory access. Direct memory access allows searcher element 202 to pass information directly to controller memory 218 without interrupting controller functions. Direct memory access operation is illustrated by dashed data line 216 that is directly connected from searcher element 212 to memory 218 within controller 200. Controller 200 uses the data stored in memory 218 to assign demodulation elements 204A–204N to one of the plurality of information signals that may be contained in input signal 210.

Demodulation elements 204A–204N process input signal 210 to produce soft decision data bits 220A–220N that are combined in symbol combiner 208. The output of symbol combiner 208 (not shown) is aggregate soft decision data suitable for Viterbi decoding. Demodulation elements 204A–204N also provide several output control signals to controller 200 through interconnection 212 that are used in the assignment process.

Figure 2:
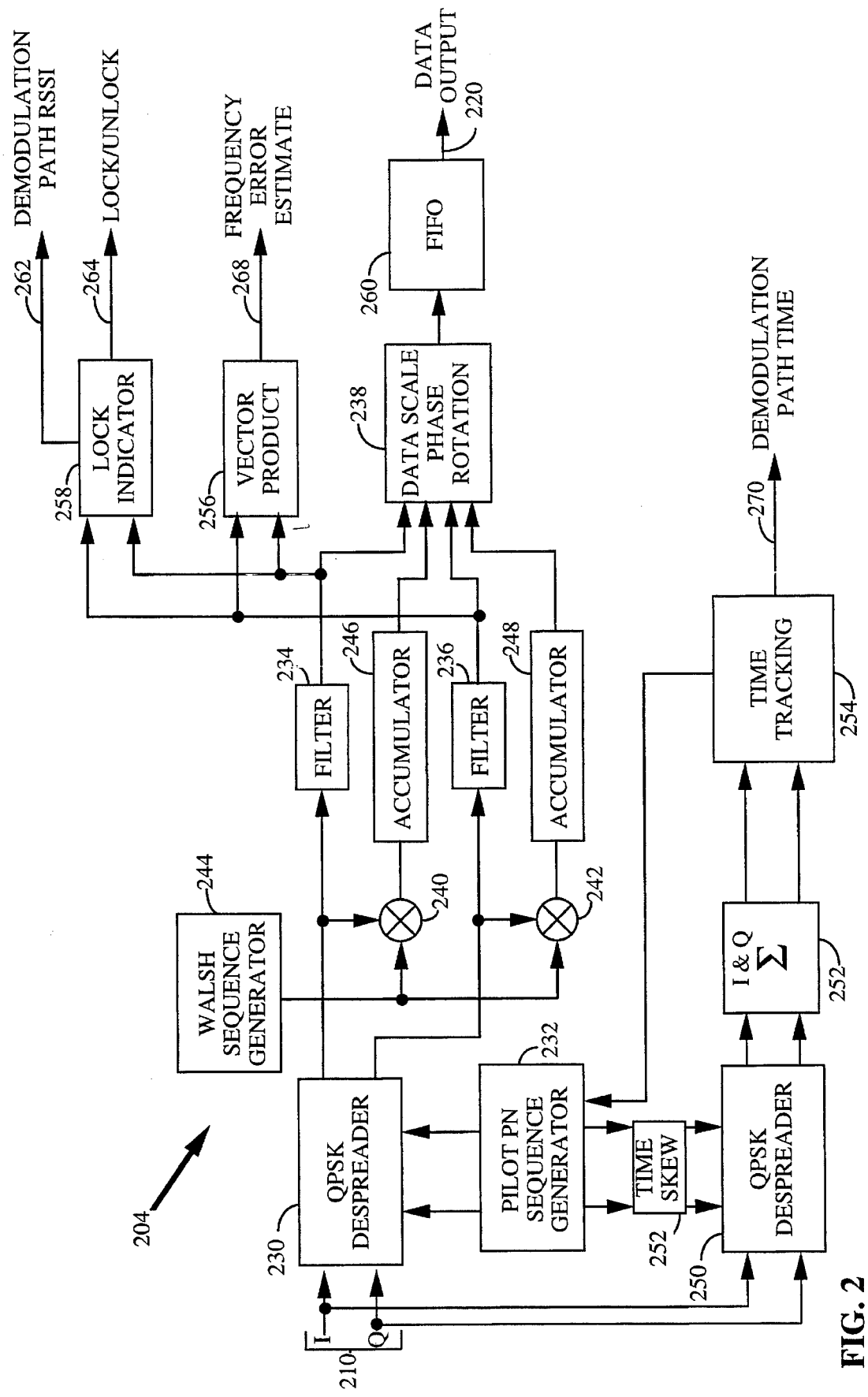
FIG. 2 is a detailed block diagram of an exemplary mobile station demodulation element of FIG. 1.

Each of demodulation elements 204A–204N is highly similar in structure to the others. FIG. 2 illustrates in further detail, an exemplary demodulation element 204 of FIG. 1. In FIG. 2, input signal 210 is assumed to be a Quadrature Phase Shift Keyed (QPSK) signal having in-phase (I) and quadrature-phase (Q) signal samples. The I and Q signal samples, each being a multiple-bit value, are input to QPSK despreaders 230 and 250.

QPSK despreader 230 also receives the pilot PN sequences $PN_I$ and $PN_Q$ from pilot PN sequence generator 232. Pilot PN sequence generator 232 generates the PN sequences $PN_I$ and $PN_Q$ identical to those used in the base station according to sequence timing and state input (not shown) as provided from controller 200 of FIG. 1. QPSK despreader 230 removes the PN spreading on the raw I and Q signal samples to extract uncovered I and Q component samples.

The uncovered I and Q component samples are respectively output from QPSK despreader 230 to digital filters 234 and 236. Filters 234 and 326 are typically configured as simple first order, low pass, digital filters. The filtered I and Q samples output from filters 234 and 236 are samples of the I and Q components of the pilot signal and are referred to as Pilot I and Pilot Q samples. The Pilot I and Pilot Q samples are provided to data scaling and phase rotation 238, lock indicator 258, and vector product 256.

In the modulation scheme considered for this example, the pilot signal uses the all-zero Walsh code. In using the all-zero Walsh code the PN spread pilot signal is the same as the I and Q PN spreading sequences themselves. Therefore by removing the PN spreading on the I and Q signal samples and filtering the result, the pilot is recovered.

To recover the data, uncovered I and Q component samples are also output from QPSK despreader 230 and output respectively to digital mixers 240 and 242. Digital mixers 240 and 242 receive a Walsh sequence from Walsh sequence generator 244. This Walsh sequence is identical to the Walsh sequence assigned to this channel in the base station and is selected according to a sequence assignment input from controller 200 (not shown).

The uncovered and decoded I and Q component samples are output from digital mixers 240 and 242 where they are respectively provided to accumulators 246 and 248. Accumulators 246 and 248 respectively accumulate the uncovered and decoded I and Q component samples over a symbol time. The output from accumulators 246 and 248 are the symbol data I and Q, referred to as Data I and Data Q samples. The Data I and Data Q samples are provided to data scaling and phase rotation 238. Accumulators 246 and 248 are cleared or reset subsequent to the data output to accumulate a next set of samples.

Data scaling and phase rotation 238 performs a dot product operation on the Pilot I and Pilot Q from filters 234 and 236 and the Data I and Data Q from accumulators 246 and 248. To find the magnitude of the component of the data vector that is in phase with the pilot, the dot product D•P of the Data I and Data Q samples, and the Pilot I and the Pilot Q sample vector is calculated. Finally the resulting data is output to first-in-first-out (FIFO) 260 storage register.

First-in-first-out (FIFO) 260 storage register performs a de-skewing function. The de-skewing functions delays the output of data 220 from a particular demodulation element so that the data can be aligned with data from other demodulation elements. For example referring again to FIG. 1, assume that demodulation element 204A is demodulating data that has taken a direct path from a first base station to the mobile station. Further assume that demodulation element 204B is demodulating a multipath signal also from the first base station The multipath signal has taken an indirect route to the mobile station and therefore is delayed compared to the direct path. To combine the two data paths in symbol combiner 208, the output of demodulation element 204A must be delayed and aligned to the output of demodulation element 204B. FIFO 260A would delay the output of data from demodulation element 204A to coincide with the output of demodulation element 204B. Further assume that demodulation element 240C (not shown) is demodulating a signal from a second base station that is located at great distance from the mobile station and therefore exhibits a delay greater than even the indirect path signal from the first base station. The output of demodulation elements 204A and 204B must be delayed by FIFO 260A and FIFO 260B respectively such that the signals input to symbol combiner 208 are time aligned.

Demodulation element 204 produces demodulation path receive signal strength indicator (RSSI) 262 and lock/unlock signal 264 to the controller. Energy accumulator and lock detector 258 calculates the average signal strength of the Pilot I and Pilot Q samples. Demodulation path RSSI 262 indicates the calculated pilot signal strength value. Lock indicator 258 compares the calculated pilot signal strength value to a threshold. If the value exceeds the threshold, the demodulation element is in lock. If the calculated pilot signal strength falls below a threshold, the demodulation element is out of lock. When the demodulation element is unlocked data output 220 may be corrupted with noise due to the low signal levels. The controller may use an unlocked indication to declare data output 220 as invalid such that it is not used to calculate the aggregate result. The lock function may be designed with hysteresis such that having once exceeded the lock threshold the demodulation element does not indicate an unlocked condition until the signal strength falls below a second, lower threshold. The controller may "de-assign" the demodulation element that is not in lock such that the demodulation element becomes idle. Alternatively the controller may label the demodulation element "free" to indicate that the demodulation element is a candidate for re-assignment while leaving the demodulation element in an active state attempting to demodulate a signal such that recovery from the unlocked state is possible.

Each demodulation element makes an estimate of the carrier frequency error. Vector product 256 produces frequency error estimate 268 by measuring the change in pilot phase between symbols. Vector product 256 calculates the cross product of the present pilot vector comprised of the Pilot I and Pilot Q samples to an earlier pilot vector. Frequency error estimate is used in a carrier tracking loop (not shown).

Demodulation element 204 tracks the time drift of the signal that it is demodulating. Input signal 210 having the I and Q signal samples is input to QPSK despreader 250. QPSK despreader 250 also receives the pilot PN sequences $PN_I$ and $PN_Q$ from pilot PN sequence generator 232 through time skew 252. Time skew 252 advances and delays pilot PN sequences $PN_I$ and $PN_Q$. QPSK despreader 250 removes the PN spreading on the I and Q signal samples to extract an advanced or delayed uncovered I and Q component samples. I & Q Summation ($\Sigma$) 252 adds the results over a set of PN samples and provides output to time tracking 254. Time tracking 254 compares the summed advanced and delayed I and Q component samples and provides demodulation path time 270 reflecting the current estimate of the time location of the incoming signal.

Each time that a demodulation element is assigned to a new signal, the demodulation element requires some time to flush out the old data that is still within the demodulation path and to lock on the new signal. This process produces a finite time where the demodulation element produces no valid output data. The present invention limits the number of re-assignments per survey (as later described) so that large blocks of data are not lost. Also the method incorporates a hysteretic comparison operation that limits excessive re-assignment between two similarly advantageous signals.

Figure 3A:
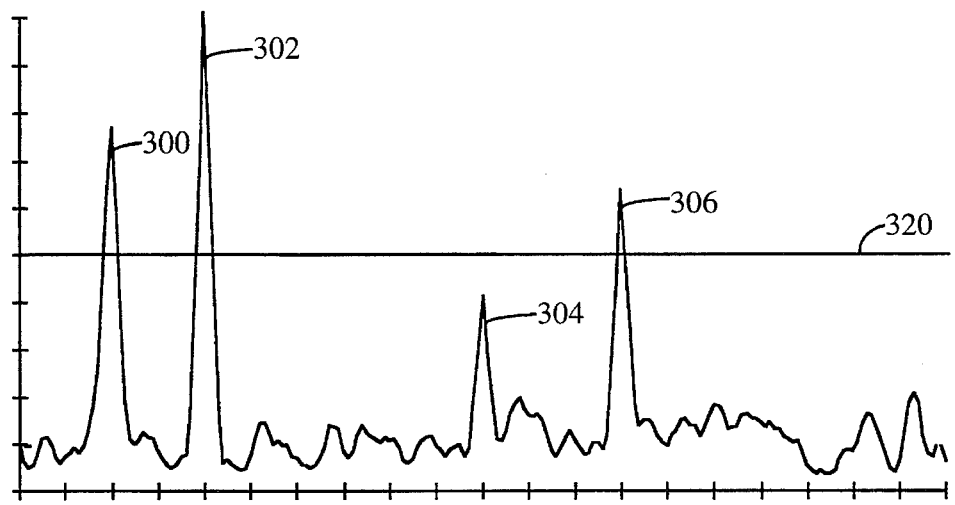
FIGS. 3A–3C illustrate the pilot signal strength versus time for three different base stations or base station sectors.
Figure 3B:
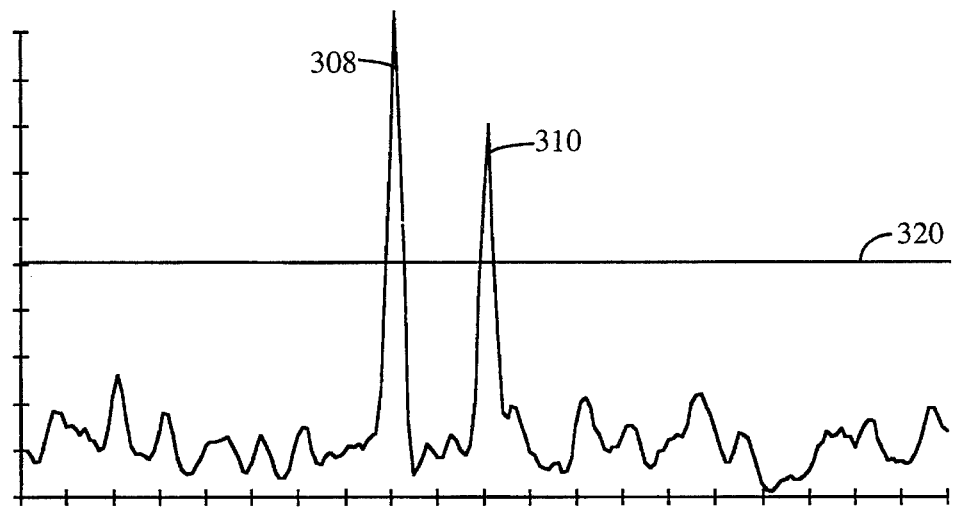
Figure 3C:
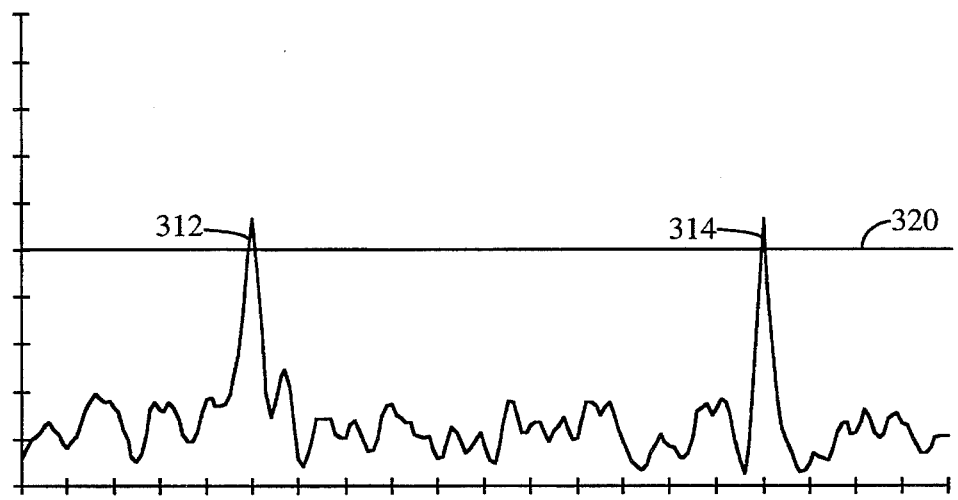

Input signal 210 provides signals to the searcher element and demodulation elements. Input signal 210 may contain pilot signals from many base stations. It may also contain information signals from a variety of base stations intended for other mobile stations as well as the present mobile station. FIGS. 3A–3C illustrate an exemplary format to view the components of input signal 210 that are needed to develop the method of the present invention. The specific method developed below assumes that three demodulation elements are available for assignment. FIG. 3A illustrates the pilot signal strength versus time for a first base station or sector. FIGS. 3B–3C illustrate the pilot signal strength versus time for a second and third base station or sector respectively. In FIGS. 3A–3C, the horizontal axis has stations of time and the vertical axis has stations of energy in dB. In FIG. 3A, four paths are higher than the noise floor and are labeled paths 300, 302, 304, and 306. Path 300 arrives first in time and can be assumed to be the most direct path available from the base station to the mobile station. Paths 302, 304, and 306 follow sequentially in time and are multipath signals of the same signal as path 300. Line 320 represents a threshold below which the signal to noise level does not produce reliable data.

FIG. 3B and FIG. 3C represent incoming signals from two other base stations or base station sectors. The time offset among the three base stations is not explicitly shown. FIGS. 3B and 3C can be thought of as normalized to the delay of FIG. 3A for the purposes of illustration. In FIG. 3B, two paths are higher than the noise floor and are labeled paths 308, and 310. Path 308 arrives first in time and paths 310 follows in time. Again line 320 represents a threshold below which the signal to noise level does not produce reliable data. In FIG. 3C, two paths are higher than the noise floor and are labeled paths 312, and 314. Path 312 arrives first in time and path 314 follows some time later. Again line 320 represents a threshold below which the signal to noise level does not produce reliable data.

As discussed above, mobile station power control is critical to overall system performance. Each mobile station must transmit the minimum signal possible for reliable communication to obtain a high system capacity. Because each base station through which the mobile station communicates independently commands the transmit power of the mobile station, the method favors a high degree of base station or base station sector diversity. For maximum system capacity, the mobile station must reduce its transmit power if any base station commands the mobile station to do so. The mobile station only increases its transmit power if every base station through which it is communicating commands an increase in transmit power. The method favors the diversity of base stations so power control information from a particular base station does not fail to reach the mobile station.

In the exemplary system described herein, only one active base station is required for a mobile station when the mobile station is in an idle state (e.g., the mobile station is on but is not involved in continuous two-way communication with a base station). As discussed above, when the mobile station enters an extended communication mode such as during a telephone call, communication may be established with a plurality of base stations. The assignment method described below applies to idle mode operation as well as during extended communication. The method of the present invention simplifies itself when only one base station is active such as when the mobile station is in idle mode. The present invention is not limited to systems that operate in this manner.

FIG. 4 is a summary of an exemplary demodulation element assignment method for a mobile station according to the present invention. The method is executed on a cyclical basis. In the first step in each cycle, the searcher element conducts a survey of pilot signal strengths versus time for each active base station as indicated by block 350 of FIG. 4. An active base station refers to a base station through which communication has been established. These base stations are referred to collectively as the set of active base stations. The searcher element scans a window of time around the expected arrival time of the signal from each base station so that multipath signals may be found. The searcher element creates a set of survey path data comprising the time offset and signal strength.

The controller matches the survey paths to the demodulation paths as indicated by block 352. The demodulation paths are paths that are currently assigned to demodulation elements. The corresponding path information (time offset and signal strength) from each demodulation element is collected by the controller.

As described above, a principal consideration for assigning a demodulation element to a path is the number of other paths from the same base station or sector that are currently assigned to demodulation elements. If a survey path is from a base station having a signal that is not currently being demodulated by any demodulation element, the survey path becomes a candidate for demodulation element assignment. If a demodulation element must be de-assigned from a path and re-assigned to a survey path in block 354, the method returns to block 350 to avoid re-assigning more then one demodulation element per cycle as indicated by block 356. If no demodulation element was re-assigned then the demodulation elements may be assigned according to signal strength as indicated by block 358. The method then returns to block 350 and the next cycle is begun.

FIGS. 5A–5D are a detailed example of the summary of the demodulation element assignment method of FIG. 4. In FIGS. 5A–5D, it is assumed that there are three demodulation elements available for assignment. However many other embodiments of the present invention will be readily apparent upon considering the implementation of FIGS. 5A–5D. For example, the number of demodulation elements may be more or less than three. Therefore FIGS. 5A–5D are not meant to limit the present invention but are meant to serve as a preferred embodiment.

Figure 5A:
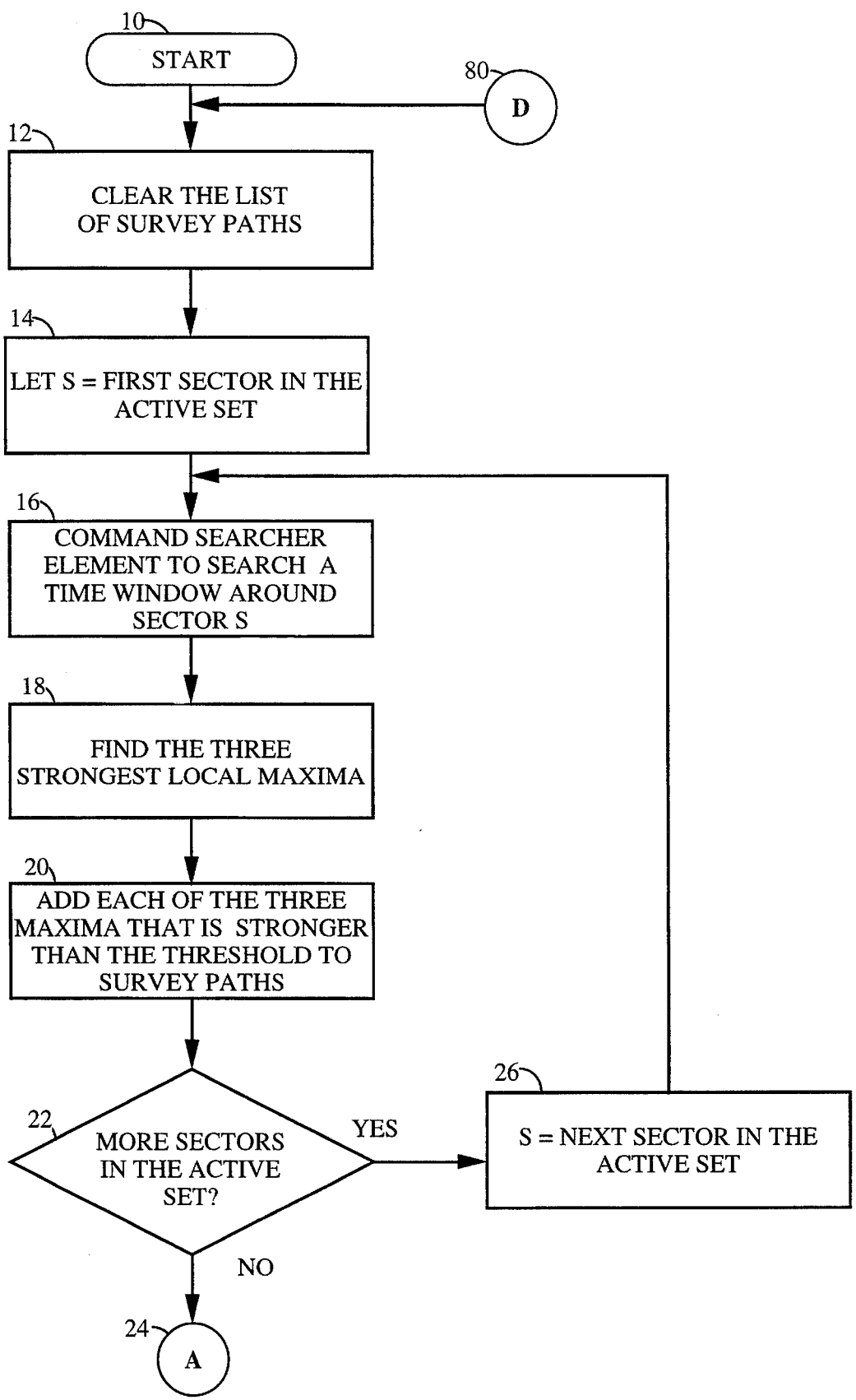
FIGS. 5A–5D are a detailed example of the demodulation element assignment method for a mobile station according to the present invention.

FIG. 5A begins the cycle and is roughly equivalent to block 350 of FIG. 4. Block 10 indicates the starting function of the method. Block 12 clears the list of survey paths found on the last cycle. Block 14 sets a first base station sector with which communication is established to be the first sector under consideration for the searching process. Block 16 commands the searcher element to search a window of time around the expected arrival time of signals from the sector under consideration. Block 18 finds no more than the three strongest local maxima from the search of the sector under consideration. In this example, finding more than the three strongest is ineffectual because only three demodulation elements are available for assignment and in no case would a demodulation element be assigned to the fourth largest survey path from a single base station sector.

In the exemplary embodiment, a local maximum is found within the search window based on the use of survey samples that are spaced 0.5 chips apart in time. If a smaller survey sample resolution is used, a single signal path would be likely create more than one distinct peak. In such a system, the distinct peaks could be used to create a single local maximum for the purposes of demodulation element assignment.

Block 20 adds the information of each of three maxima that exceed a minimum signal level threshold to the list of survey paths. If a sector in the active set exists that has not been searched, block 22 directs the method to block 26. Block 26 selects the next sector under consideration and blocks 16 thorough 22 are repeated for the next sector under consideration. If the sector under consideration is the last sector to be searched, the survey list is complete. Block 22 directs the flow to the next portion of the method through connection block 24.

Figure 5B:
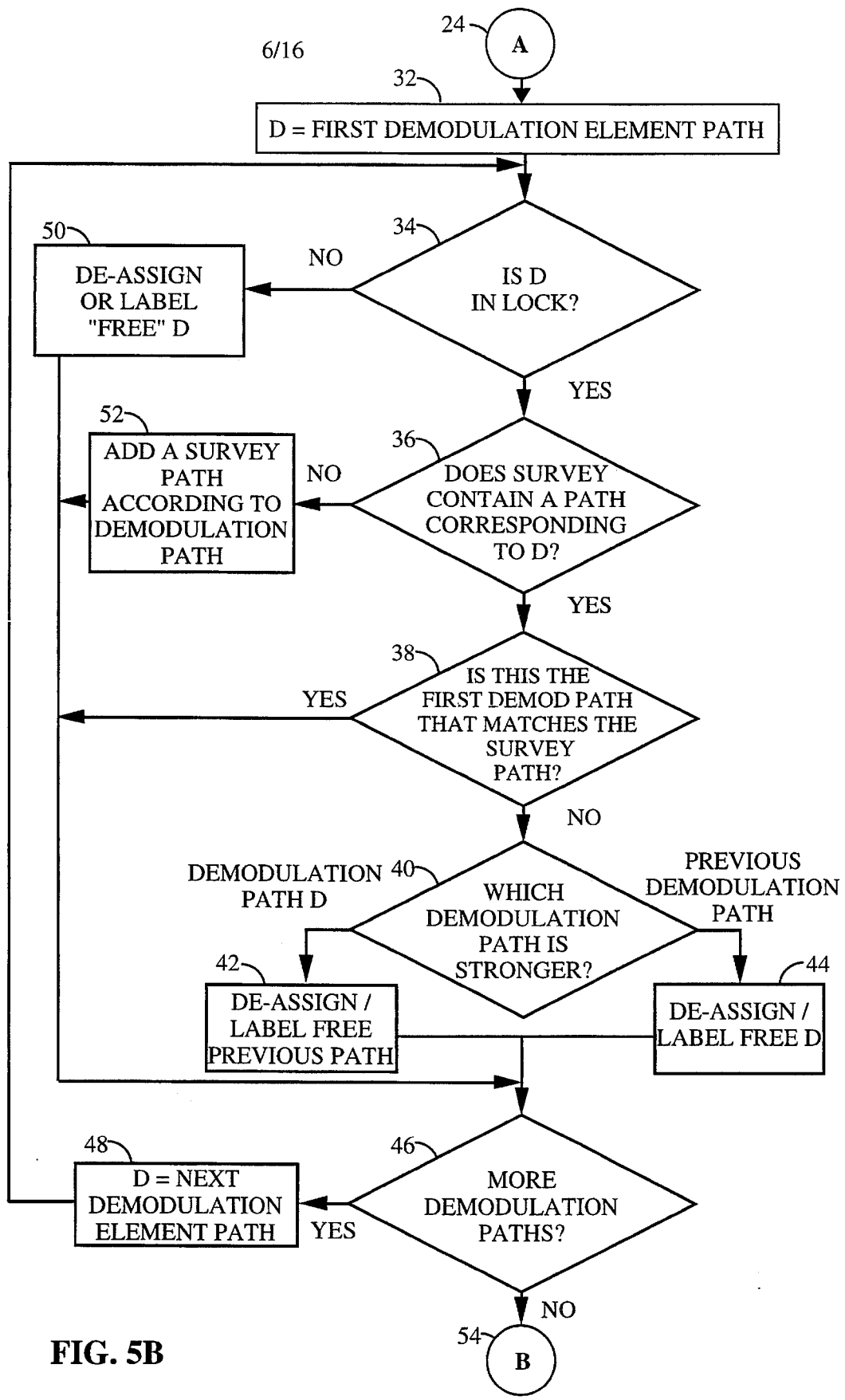

Having attained the set of survey paths, the method continues on FIG. 5B which is roughly equivalent to block 352 of FIG. 4. Connection block 24 directs the flow to block 32. Block 32 sets the demodulation path under consideration to one of the paths that is currently being demodulated by a demodulation element. Block 34 checks the lock/unlock state of the demodulation element corresponding to the demodulation path under consideration. If the demodulation element is unlocked the controller may de-assign the demodulation element or it may label the demodulation element "free" as indicated by block 50. In such a case no valid data exists to match to the survey paths. Action corresponding to the demodulation path under consideration is complete and block 50 directs the flow to block 46.

If the demodulation element under consideration is currently in lock, block 36 attempts to match the time offset of the demodulation path to the analogous information in the list of survey paths. In general, each demodulation path matches with at least one survey path. In other words, if a path from a base station is strong enough to be demodulated, it should be detectable by the searcher element. On occasion, the searcher element may miss a path and therefore not enter a path corresponding to a demodulation path on the survey path list. The demodulation element more accurately estimates the signal level and time offset of a path than the searcher element. Therefore the method considers that the demodulation element is accurate and that such a path does exist. Therefore if there is no survey path entry for a demodulation path, block 52 creates a survey path entry corresponding to the demodulation path. Action corresponding to the demodulation path under consideration is complete and block 52 directs the flow to block 46.

If a survey path exists that corresponds to the demodulation path under consideration, block 38 inquires if the demodulation path under consideration is the first demodulation path to match the particular survey path. If the demodulation path under consideration is the first, action corresponding to the demodulation path under consideration is complete and block 38 directs the flow to block 46.

If the demodulation path under consideration is not the first demodulation path to match the particular survey path, two demodulation elements are demodulating substantially the same path. This scenario can be a common occurrence. Each demodulation element tracks the signal to which it was originally assigned. Commonly two multipath signals over time merge into one path or nearly the same path. Block 38 identifies such a situation. If the demodulation path under consideration is not the first demodulation path to match a particular survey path, block 40 determines which demodulation path has the stronger signal level. If the demodulation element under consideration has the stronger signal level, block 42 de-assigns or labels free the previous demodulation element having a path matching this same survey path. If the demodulation element under consideration is weaker than the previous path, block 44 de-assigns or labels free the demodulation element corresponding to the demodulation path under consideration. Action corresponding to the demodulation path under consideration is complete.

If a demodulation path exists that has not yet been considered, block 46 directs the method to block 48. Block 48 selects the next demodulation path under consideration and block 34 begins to repeat the process for that demodulation path. If the demodulation path under consideration is the last demodulation path to be considered, block 46 directs the flow to the next portion of the method though connection block 54.

Figure 5C:
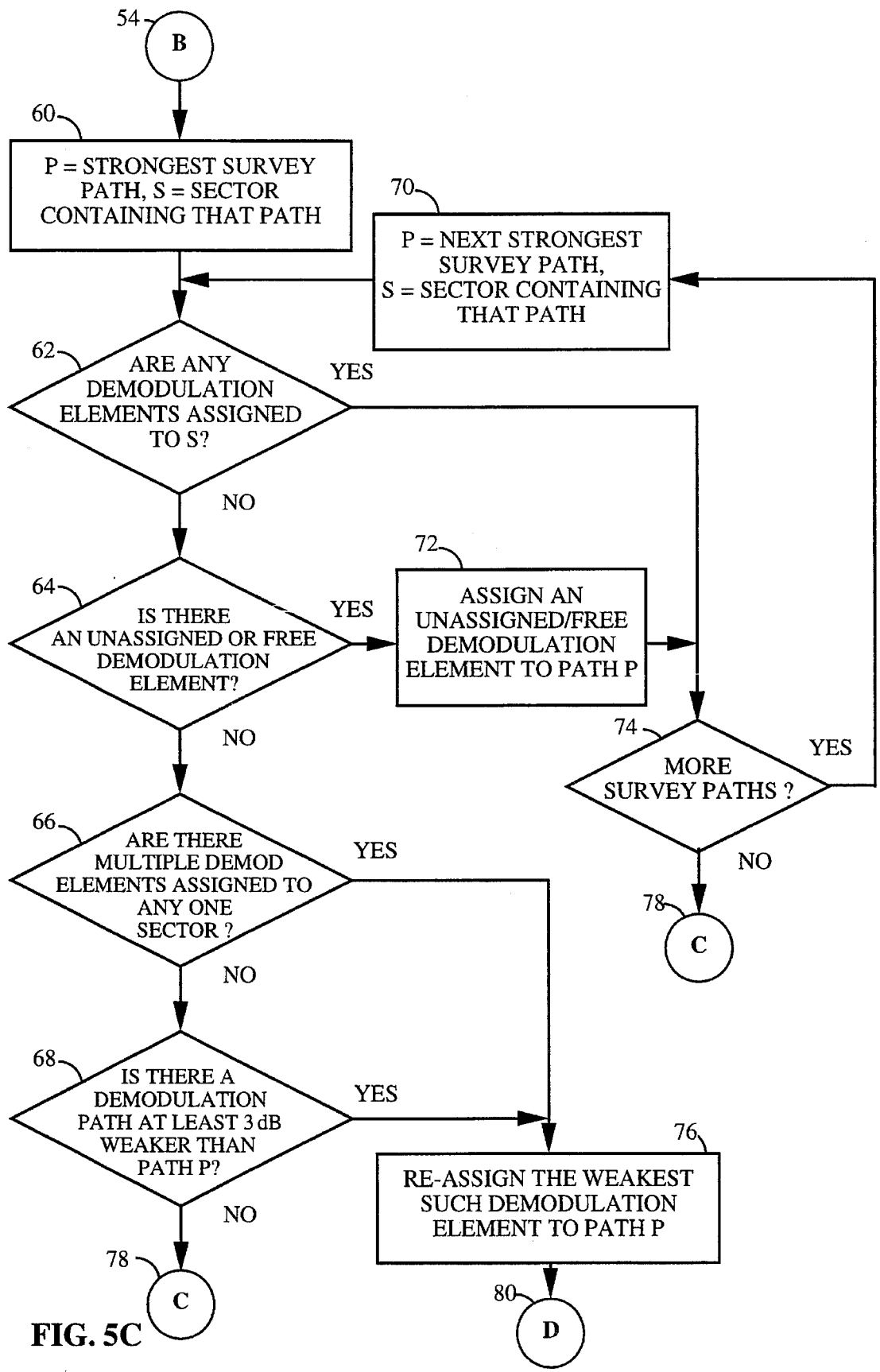

Having attained the set of survey paths and matched the demodulation paths to the survey paths, the method continues on FIG. 5C which is roughly equivalent to blocks 354 and 356 of FIG. 4. Connection block 54 directs the flow to block 60. Block 60 sets the survey path under consideration to the survey path with the strongest signal level. Block 60 also makes note of the base station sector to which the survey path corresponds. The method of FIG. 5 stresses sector diversity as being the most advantageous for power control given a specific system implementation. A method according to the present invention could emphasize base station diversity. Emphasizing base station diversity over sector diversity may be advantageous in other systems.

To maximize sector diversity, Block 62 inquires whether a demodulation element is assigned to demodulate any path from the sector of the survey path under consideration. If so, action corresponding to the survey path under consideration is complete. If there is no demodulation element assigned to any path from the sector of the survey path under consideration, flow continues to block 64. Block 64 asks if any demodulation element is free or unassigned. If an unassigned or free demodulation element exists, block 72 assigns the unassigned or free demodulation element to the demodulation path under consideration and action corresponding to the survey path under consideration is complete.

The process of FIG. 5C may continue for the next survey path. Therefore the method continues from block 62 and from block 72 to block 74. Block 74 inquires whether a remaining survey path exists. If a remaining survey path exists, block 70 chooses the next strongest survey path to be the survey path under consideration and the flow continues through block 62. If an additional survey path does not exist, the flow continues through connection block 78 to FIG. 5D.

Continuing from block 64 if no unassigned or free demodulation element exists, block 66 inquires if multiple demodulation elements are assigned to any one sector. If a sector having more than one demodulation path exists, block 76 re-assigns the demodulation element having the weakest such demodulation path. This re-assignment is the sole re-assignment for this cycle and the flow continues though connection block 80 to the beginning of a new cycle on FIG. 5A.

Continuing from block 66 if no sector exists having more than one demodulation path, block 68 inquires if a demodulation path has a signal strength at least 3 dB weaker than the signal strength of the survey path under consideration. The 3 dB offset is the hysteresis window to prevent excessive re-assignment between two similarly advantageous paths. Larger or smaller hysteresis windows could be used depending on the system application. If such a 3 dB weaker path exists, block 76 re-assigns the demodulation element corresponding to the weakest such demodulation path to the survey path. This re-assignment is the sole re-assignment for this cycle and the flow continues though connection block 80 to the beginning of a new cycle on FIG. 5A. If no such 3 dB weaker path exists, the remaining survey paths would flow through FIG. 5C in the same manner as the demodulation path under consideration. Therefore if no such path exists, meaning that no re-assignments have occurred during this cycle, flow continues from block 68 through connection block 78 to FIG. 5D.

Figure 5D:
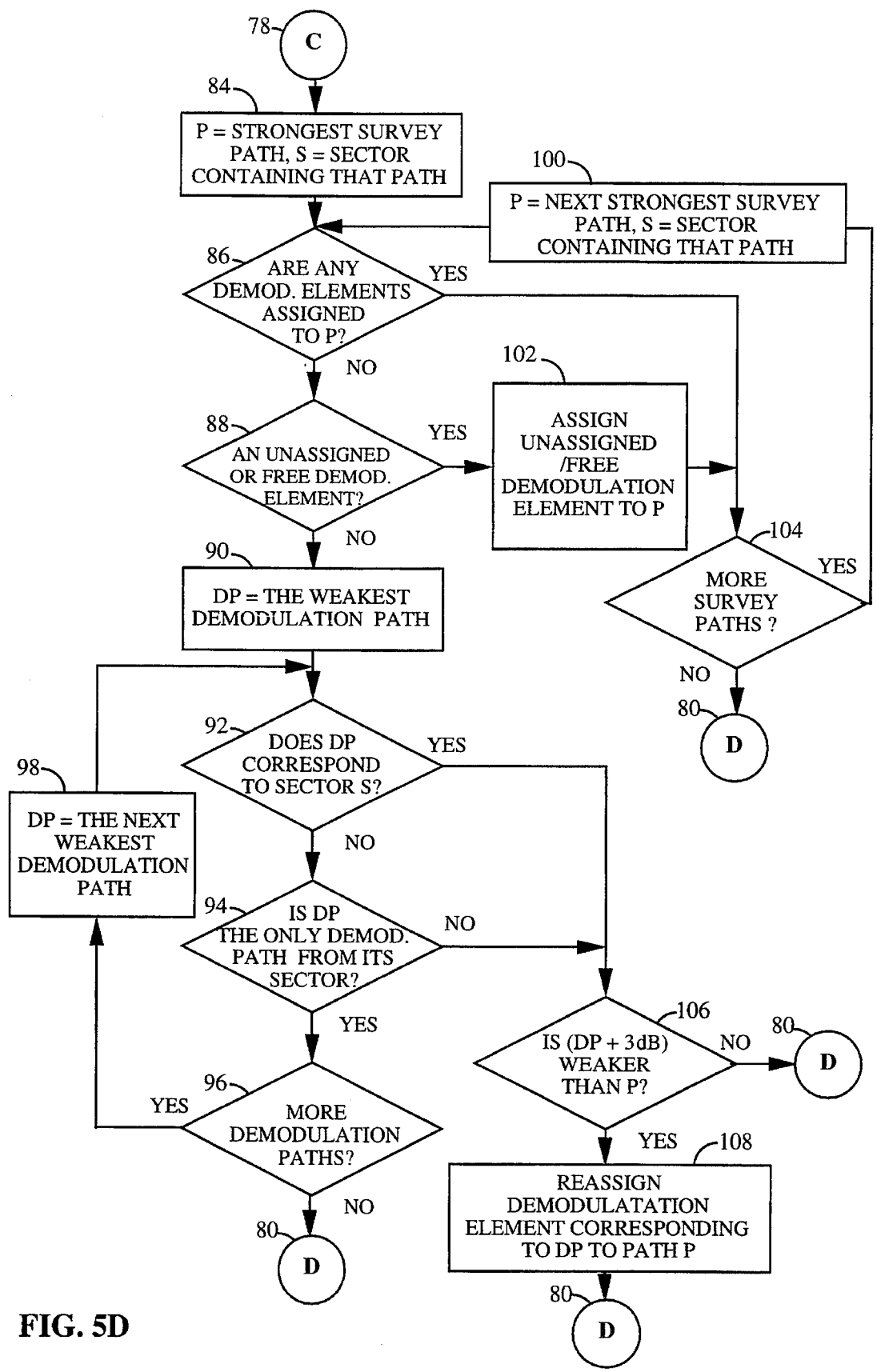

Having attained the set of survey paths and matched the demodulation paths to the survey paths, the method continues on FIG. 5D if no re-assignment has occurred thus far during this cycle. FIG. 5D is roughly equivalent to block 358 of FIG. 4. Connection block 78 directs the flow to block 84. Block 84 sets the survey path under consideration to the survey path with the strongest signal level. Block 84 also makes note of the base station sector to which the survey path under consideration corresponds. The method of FIG. 5D stresses sector diversity as being the most advantageous for power control. However as discussed above, an alternate implementation of the present invention could emphasize base station diversity independent of sector.

Block 86 inquires if a demodulation element is assigned to the survey path under consideration. If a demodulation element has a demodulation path corresponding to the survey path under consideration, block 104 asks if any more survey paths exist. If another survey path exists, block 100 sets the survey path with the next highest signal level to be the survey path under consideration and notes the sector corresponding to the new survey path under consideration. The process begins again at block 86. If the survey path under consideration is the last survey path to be considered, the flow continues though connection block 80 to the beginning of a new cycle on FIG. 5A.

If no demodulation element exists having a demodulation path corresponding to the survey path under consideration, block 88 asks if an unassigned or free demodulation element exists. If an unassigned or free demodulation element exists, block 102 assigns the unassigned or free demodulation element to the survey path under consideration. The flow continues through block 104 as described above. If an unassigned or free demodulation element does not exist, block 90 selects the weakest demodulation path for comparison with the survey path under consideration.

Block 92 inquires if the demodulation path for comparison corresponds to the sector of the survey path under consideration. If the demodulation path for comparison is from the same sector as the survey path under consideration, block 106 asks if the signal level of the demodulation path for comparison is more than 3 dB weaker than the signal level of the survey path under consideration. The 3 dB delta is the hysteresis window to prevent excessive re-assignment between two similarly advantageous paths. Larger or smaller hysteresis windows could be used depending on the system application. If the survey path signal level is not at least 3 dB larger than the demodulation path for comparison, the cycle begins over as indicated by connection block 80.

If the signal level of survey path is at least 3 dB larger than the signal level of the demodulation path for comparison, the demodulation element corresponding to the demodulation path for comparison is re-assigned to the survey path under consideration as indicated by block 108. This re-assignment is the sole re-assignment for this cycle and the cycle begins over at FIG. 5A as indicated by connection block 80.

Continuing at block 92, if the demodulation path for comparison is not from the same sector as survey path under consideration, block 94 inquires if the demodulation path for comparison is the only demodulation path from the sector corresponding to the demodulation path for comparison. If the demodulation path for comparison is not the only demodulation path from its sector, the flow continues through block 106 as described above.

If the demodulation path for comparison is the only demodulation path from its sector, block 96 inquires if a remaining demodulation path exists. If no remaining demodulation path exists, the cycle begins over at FIG. 5A as indicated by connection block 80. If a remaining demodulation path exists, the demodulation path for comparison is set to the demodulation path having the next weakest signal strength by block 98. The flow continues at block 92.

By way of example let us assume that the method of FIGS. 5A–5D is executed based on the signals shown in FIGS. 3A–3C. Assume that no other base station sectors are available to the mobile station. Assume that the three demodulation elements are assigned as follows:

| Demod. element | Time offset | Signal Level | Locked | Sector |
| --- | --- | --- | --- | --- |
| 1 | $t_1$ | $A_1$ | Y | 3A |
| 2 | $t_2$ | $A_2$ | N | 3A |
| 3 | $t_3$ | $A_3$ | Y | 3A | where the sector corresponds to the figure numbers in FIGS. 3A–3C. The flow begins on FIG. 5A. The survey list is cleared and the sector of FIG. 3A is set as the first sector under consideration (blocks 10–14). The searcher element begins a search for the multipath signals as shown FIG. 3A and labeled as follows:

| Path Label | time offset | Signal level | Sector |
| --- | --- | --- | --- |
| 300 | $t_{10}$ | $A_{10}$ | 3A |
| 302 | $t_{11}$ | $A_{11}$ | 3A |
| 304 | $t_{12}$ | $A_{12}$ | 3A |
| 306 | $t_{13}$ | $A_{13}$ | 3A |

Path 304 is the smallest of the four levels and is below the threshold level as indicated by threshold line 320. The searcher element finds three maxima (blocks 16–20). Therefore the final data added to the list of survey paths for this cycle is as follows:

| Path Label | time offset | Signal level | Sector |
| --- | --- | --- | --- |
| 300 | $t_{10}$ | $A_{10}$ | 3A |
| 302 | $t_{11}$ | $A_{11}$ | 3A |
| 306 | $t_{13}$ | $A_{13}$ | 3A. |

Sector 3B is set as the next sector under consideration (blocks 22 and 26). Two more entries are added to the list of survey path as follows (blocks 16–20):

| Path Label | time offset | Signal level | Sector |
| --- | --- | --- | --- |
| 308 | $t_{14}$ | $A_{14}$ | 3B |
| 310 | $t_{15}$ | $A_{15}$ | 3B |

Sector 3C is set as the next sector under consideration (blocks 22 and 26). Two more entries are added to the list of survey path as follows (blocks 16–20):

| Path Label | time offset | Signal level | Sector |
| --- | --- | --- | --- |
| 312 | $t_{16}$ | $A_{16}$ | 3C |
| 314 | $t_{17}$ | $A_{17}$ | 3C |

Thus the list of survey paths is complete and the flow continues to FIG. 5B.

FIG. 5B begins by setting the path of demodulation element 1 to be the first path under consideration. Because demodulation path 1 is locked, the demodulation path is matched to a survey path (block 34–36). Suppose in this example that $t_1$ is approximately equal to $t_{10}$ and thus demodulation path 1 matches to survey path 300. Because demodulation path 1 is the first demodulation path to match survey path 300, the process continues for the next demodulation path (blocks 38 and 46).

Demodulation path 2 is set as the demodulation path under consideration (block 48). Because demodulation path 2 is unlocked, demodulation path 2 is labeled free (blocks 34 and 50). The process continues for the next demodulation path (block 46).

Demodulation path 3 is set as the demodulation path under consideration (block 48). Because demodulation path 3 is locked, the demodulation path is matched to a survey path (block 34–36). Suppose in this example that $t_3$ is also approximately equal to $t_{10}$ and thus demodulation path 3 matches to survey path 300 as did demodulation path 1. Because demodulation path 3 is the second demodulation path to match survey path 300, the process compares the amplitude of the two paths (blocks 38 and 40). In this example suppose that $A_3 < A_1$ and therefore demodulation element 3 is labeled free (block 44). Because demodulation path 3 is the last demodulation path, the functions of FIG. 5B are complete and the flow continue to FIG. 5C with the following list of demodulation paths:

| | Demod. element | Time offset | Signal Level | Locked | Sector |
| --- | --- | --- | --- | --- | --- |
| | 1 | $t_1 \approx t_{10}$ | $A_1$ | Y | 3A |
| FREE | 2 | | | | |
| FREE | 3 | | | | | and the following list of survey paths:

| Path Label | time offset | Signal level | Sector | Matched |
| --- | --- | --- | --- | --- |
| 300 | $t_{10}$ | $A_{10}$ | 3A | Demod path 1 |
| 302 | $t_{11}$ | $A_{11}$ | 3A | |
| 306 | $t_{13}$ | $A_{13}$ | 3A | |
| 308 | $t_{14}$ | $A_{14}$ | 3B | |
| 310 | $t_{15}$ | $A_{15}$ | 3B | |
| 312 | $t_{16}$ | $A_{16}$ | 3C | |
| 314 | $t_{17}$ | $A_{17}$ | 3C | |

Assuming that $A_{14}$ is the strongest signal level, FIG. 5C starts by setting survey path 308 as the survey path under consideration and 3B as sector containing that path (block 60). In this case no demodulation element is assigned to sector 3B and demodulation element 2 is free (blocks 62 and 64). Therefore demodulation element 2 is assigned to survey path 308 and the new list of demodulation paths is as follows:

| Demod. element | Time offset | Signal Level | Locked | Sector |
| --- | --- | --- | --- | --- |
| 1 | $t_1$ | $A_1$ | Y | 3A |
| 2 | $t_{14}$ | $A_{14}$ | Y | 3B |
| FREE 3 | | | | |

Assuming that $A_{11}$ is the next strongest signal level, survey path 302 is the next survey path under consideration and 3A is the sector containing that path (blocks 74 and 70). Because there is already a demodulation element assigned to sector 3A, survey path 310 is set as the next survey path under consideration and 3B as sector containing that path (blocks 62, 74, and 70), assuming that $A_{15}$ is the next strongest signal level. This process continues through survey paths 300 and 306, assuming that $A_{10}$ and $A_{13}$ follow in order of signal strength. When survey path 314 is the path under consideration and 3C is the sector containing that path, previously free demodulation element 3 is assigned to survey path 314 (blocks 62, 64, and 72). Survey path 312 is set as the survey path under consideration (blocks 74 and 70) and because demodulation path 3 is assigned to sector 3C the functions of FIG. 5C are complete (blocks 62, and 74) the list of demodulation paths is as follows:

| Demod. element | Time offset | Signal Level | Locked | Sector |
| --- | --- | --- | --- | --- |
| 1 | $t_1$ | $A_1$ | Y | 3A |
| 2 | $t_{14}$ | $A_{14}$ | Y | 3B |
| 3 | $t_{17}$ | $A_{17}$ | Y | 3C |

In this scenario, no demodulation element has been re-assigned up to this point, so the flow continues to FIG. 5D. Survey path 308 is against set as the survey path under consideration (block 84). Because survey path 308 is assigned to demodulation element 2, the process continues with survey path 302 as the survey path under consideration (blocks 86, 104, and 100). Survey path 302 is not currently being demodulated by any demodulation element and therefore demodulation path 3 is set to be the demodulation path under consideration because it is the weakest demodulation path (blocks 86, 88, and 90). Because demodulation path 3 is not from the same sector as the survey path 302 and because no other demodulation element is assigned to sector 3C, demodulation path 1 is set to be the demodulation path under consideration because it is the next weakest demodulation path (blocks 92, 94, 96, and 98). Demodulation path 1 is contained in to the same sector as survey path 3A (block 92). Supposing that $A_{11}$ is more than 3 dB greater than $A_1$, demodulation element 1 is re-assigned to survey path 302. This re-assignment ends the process of this cycle. The survey path is cleared (block 12) for the next cycle and the list of demodulation paths is as follows:

| Demod. element | Time offset | Signal Level | Locked | Sector |
| --- | --- | --- | --- | --- |
| 1 | $t_{11}$ | $A_{11}$ | Y | 3A |
| 2 | $t_{14}$ | $A_{14}$ | Y | 3B |
| 3 | $t_{17}$ | $A_{17}$ | Y | 3C |

The base station method is less complicated than the mobile station method. Unlike the mobile station, the base station having multiple sectors is not concerned with sector diversity because no analogous power control information is sent from the mobile station. The base station method focuses on assigning all available demodulation elements to the strongest paths while avoiding excessive re-assignments.

Figure 6:
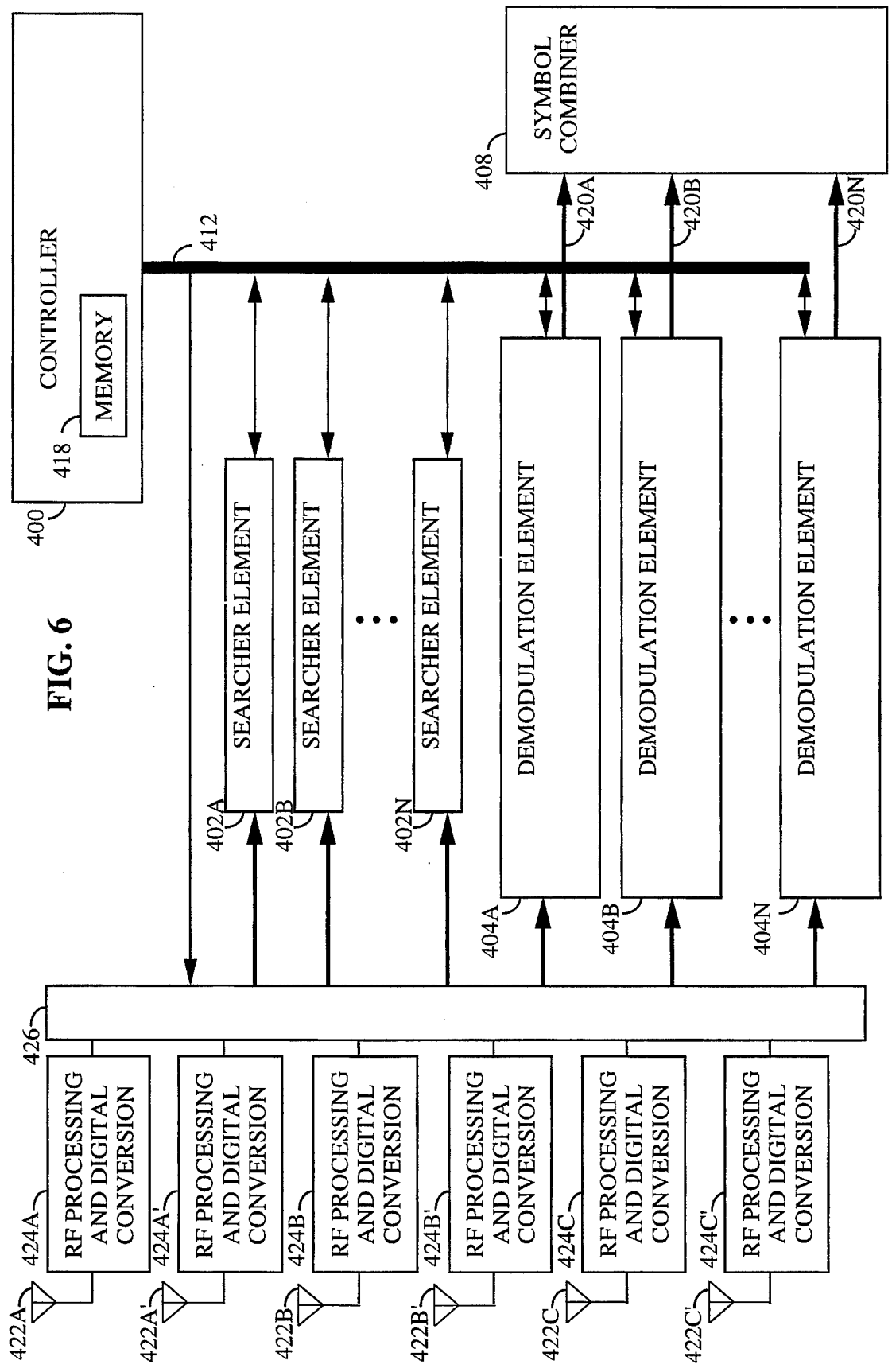
FIG. 6 is an illustration of an exemplary base station comprising multiple independent demodulation elements.

The method used by the base station assumes that the base station comprises multiple independent demodulation elements. FIG. 6 illustrates an embodiment of such a base station. FIG. 6 represents a three-sectored base station where each of antennas 422A–422C is the antenna for one sector. Each of antennas 422A'–422C' corresponds to one of antennas 422A–422C and is the diversity antenna for the sector corresponding to the like numbered antenna. Each of antennas 422A–422C covers the same coverage area as the corresponding antenna of antennas 422A'–422C'. In a typical base station, antennas 422A–422C have overlapping coverage areas that subdivide the base station into three sectors where each antenna covers more than one third of the total aggregate coverage area of the base station. Therefore a signal from a single mobile station may be present at more than one antenna at a time. The number of sectors and the number of antennas assigned to each sector may vary. Variations of this type do not effect the general principles of the present invention.

Antennas 422A, 422B, 422C, 422A', 422B', and 422C' supply the received signal to RF processing and digital conversions 424A, 424B, 424C, 424A', 424B', and 424C' respectively. RF processing and digital conversions 424A, 424B, 424C, 424A', 424B', and 424C' process the RF signal and convert the signal to digital bits. RF processing and digital conversions 4 424A, 424B, 424C, 424A', 424B', and 424C' filter the digital bits and provide the resulting digital bits to interface port 426. Interface port 426 may connect any of the six incoming signal paths to any of the searcher elements or demodulation elements under the control of controller 400 through interconnection 412.

The searcher and demodulation elements are also controlled by controller 400 through interconnection 412. Searcher elements 402A–402N continually scan a time domain window in search of a particular mobile station's information signal as controlled by system controller 400. Searcher elements 402A–402N also scan a set of time offsets around the nominal arrival of the signal in search of multipath signals that have developed.

Searcher elements 402A–402N pass the developed data to controller 400 for storage in memory 418. Searcher elements 402A–402N may pass data through a standard bus or searcher elements 402A–402N may pass data to memory 418 through direct memory access (not shown) as discussed previously in reference to FIG. 1. Controller 400 uses the data stored in memory 418 to assign demodulation elements 404A–404N to one of the plurality of information signals from a single mobile.

In this exemplary embodiment, to maintain a high system capacity, each mobile station in the system does not continually transmit a pilot signal. The lack of a pilot signal on the reverse link increases the time needed to conduct with a single searcher element a survey of all possible time offsets at which a mobile station signal may be received. Therefore, to provide a rapid searching process, more than one searcher element is used to conduct a full search. Each of searcher elements 402A–402N is assigned by the controller to search a set of time offsets. Each of searcher elements 402A–402N supplies back to controller 400 the results of the search it performs. Controller 400 tabulates these results for use in the assignment method.

Demodulation elements 404A–404N produce data bits 420A–420N that are combined in symbol combiner 408. The output of symbol combiner 408 (not shown) is aggregate soft decision data suitable for Viterbi decoding. Notice that symbol combiner 408 can combine signals from just one sector to produce an output or it can combine symbols from multiple sectors as selected by the interface port 426. When symbol combiner 408 is combining signals from a mobile station that is communicating through more than one sector, this state is referred to as softer handoff. The base station may send the output of symbol combiner 408 to a cellular system controller where symbols from a common mobile station also combine with signals from other base stations to produce a single output. This process is referred to as soft handoff. Demodulation elements 404A–404N also provide several output control signals to controller 400 through interconnection 412 that are used in the assignment process.

Figure 7:
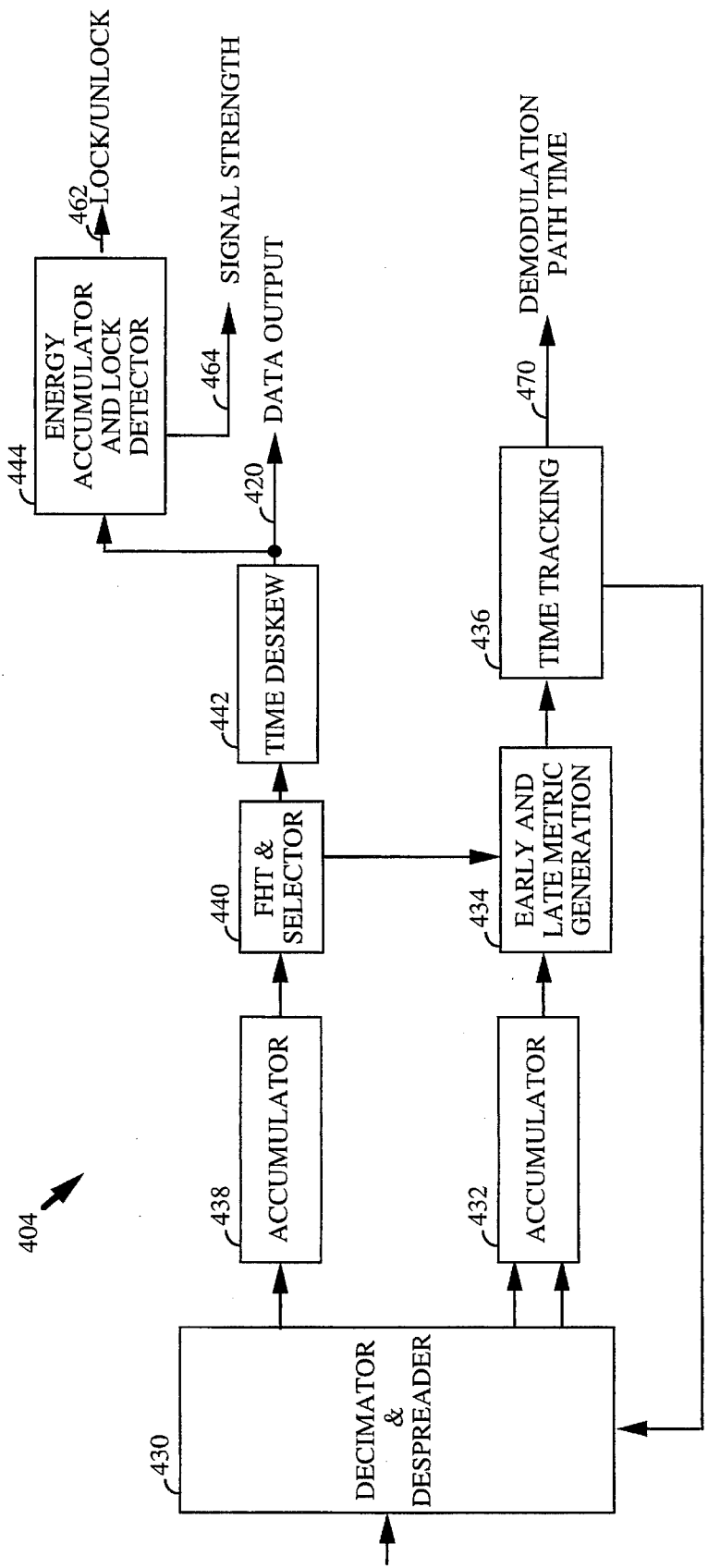
FIG. 7 is a detailed block diagram of an exemplary base station demodulation element of FIG. 6.

Each of demodulation elements 404A–404N is highly similar in structure to the others. FIG. 7 illustrates in further detail demodulation element 404 of FIG. 6. In FIG. 7, the digitized input signal is assumed to be a Quadrature Phase Shift Keyed (QPSK) signal having in-phase (I) and quadrature-phase (Q) signal samples. The I and Q signal samples, each being a multiple-bit value, are input to decimator and despreader 430. Typically the I and Q signal samples are over-sampled in that the input is received at a data rate higher than the chip rate. In decimator and despreader 430, the data is decimated from the over-sampled data rate to the PN chip rate. The data is then despread by decimator and despreader 430 using the same PN sequence used to modulate this signal in the mobile station.

Decimator and despreader 430 outputs despread I and Q signal components to the accumulator 438. Accumulator 438 accumulates the despread I and Q signal components over a Walsh Chip period to produce accumulated I and Q chip data. The accumulated I and Q chip data is then processed by the Fast Hadamard Transformer (FHT) and selector 440. The FHT portion of FHT and selector 440 correlates the accumulated I and Q chip data with all possible Walsh sequences. Each I and Q correlation result is then used to estimate the magnitude of the corresponding Walsh symbol. The magnitude estimates from each of the I and Q correlation results are compared with each other. The Walsh symbol corresponding to the I and Q correlation result that has the biggest magnitude is selected by the selector portion of FHT and selector 440 as the demodulated Walsh symbol. The demodulated Walsh symbol is output along with the corresponding estimated magnitude of that Walsh symbol.

As was the case with the mobile station, due to the different arrival times of signal paths assigned to the different demodulation elements, demodulation element 404 also performs a de-skewing of the symbols. Time de-skew 442 delays the output such that each demodulation element provides synchronized data with relation to the other demodulation elements.

Energy accumulator and lock detector 444 sums a series of consecutive Walsh symbol magnitudes. The resulting sum is output as signal strength 464 to the controller for use in the assignment method. The resulting sum is also compared with a threshold to indicate a locked or unlocked state.

The arrival time of the signal path assigned to demodulation element 404 may change over time because of movement of the mobile station or change in the mobile station's surroundings. Therefore, like that of the mobile station, the base station demodulation element incorporates time tracking circuitry. Decimator and despreader 430 outputs an early and a late version of despread I and Q signal components to be used in the time tracking process. Accumulator 432 accumulates the early and the late, despread I and Q signal components over a Walsh chip period to produce accumulated early and late, I and Q chip data. Early and late metric generation 434 multiplies the accumulated early and late, I and Q chip data by the Walsh sequence corresponding to the demodulated Walsh symbol and accumulates the result to produce early and late, I and Q Walsh symbols. The magnitude of the early Walsh symbol is found based on the early I and Q Walsh symbol and the magnitude of the late Walsh symbol is found based on the late I and Q Walsh symbol. The early symbol magnitude is subtracted from the late symbol magnitude to produce an error metric. The error metric is output to time tracking 436. Time tracking 436 uses the error metric to determine if the despreading operation in decimator and despreader 430 is running ahead, behind, or on time. Time tracking 436 also keeps track of absolute demodulation path time 470 of the demodulation element for output to the controller.

The searcher elements are similar to the demodulation element with the exception that the searcher elements do not have time tracking and lock detection. Time tracking is not needed in searcher elements because the searching process is done rapidly with respect to the channel's coherence. In other words, time drifts are negligible during the time used to perform a single search.

Figure 8:
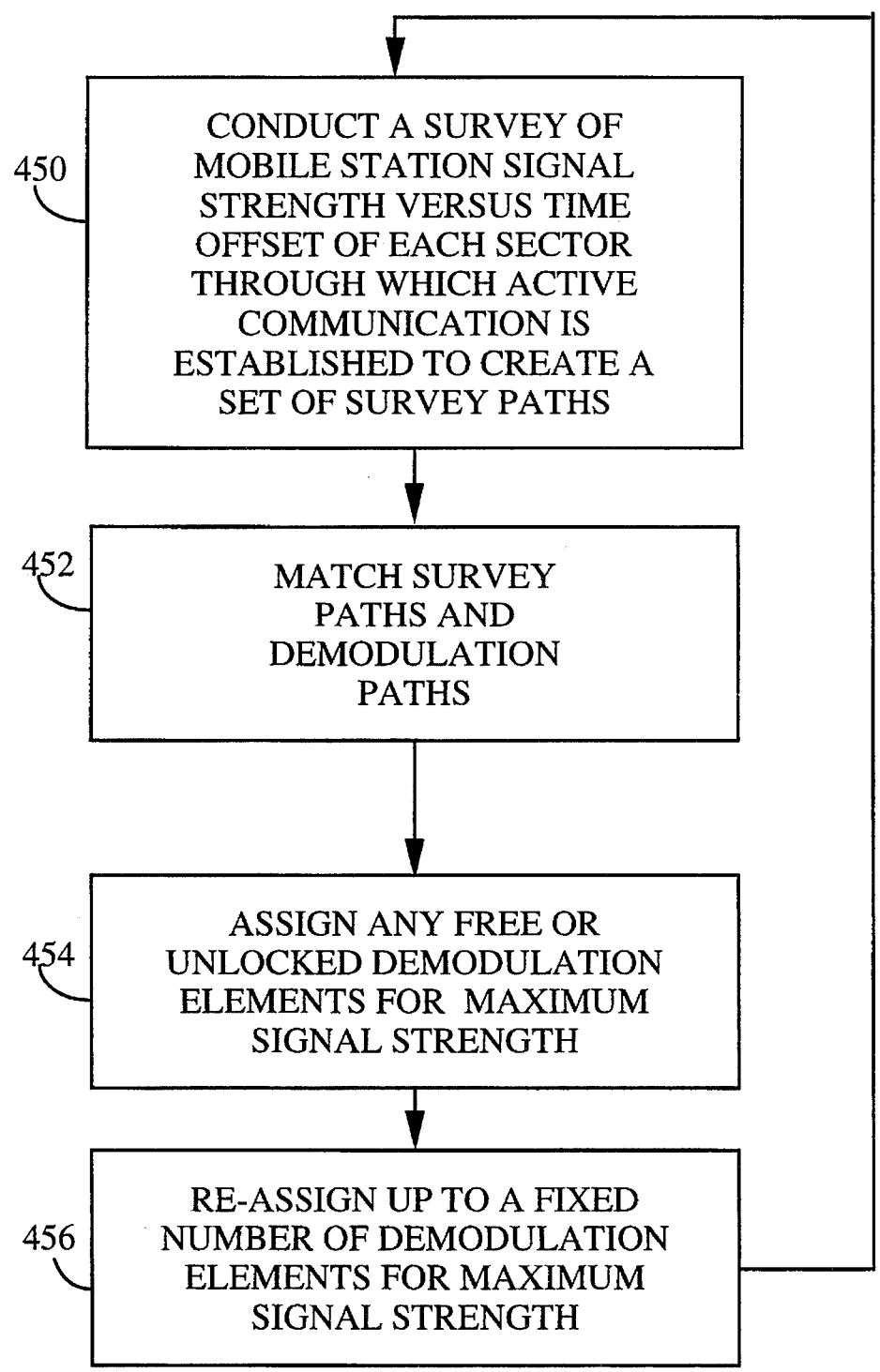
FIG. 8 is a summary of the demodulation element assignment method for a base station according to the present invention.

FIG. 8 is a summary of an exemplary demodulation element assignment method for a sectorized base station according to the present invention. The method is executed on a cyclical basis. In the first step in each cycle, the searcher elements conduct a survey of mobile station signal strength versus time for a single mobile station with which communication is established as indicated by block 450 of FIG. 8. Each searcher element scans a window of time around the expected arrival time of the signal from the mobile station so that multipath signals may be found. The controller creates a set of survey path data based on the search elements' data comprising time offsets and signal strengths.

The controller matches the survey paths to the demodulation paths as indicated by block 452. The demodulation paths are paths that are currently assigned to demodulation elements. The corresponding path information (time offset and signal strength) from each demodulation element is collected by the controller.

As described above, a principal consideration for assigning demodulation elements in the base station is to obtain the highest possible aggregate signal level. All free and unlocked demodulation elements are assigned to the highest signal strength survey paths that do not correspond to demodulation paths in block 454. Also in each cycle, up to a fixed number of the demodulation elements may be re-assigned to survey paths having stronger signal strength than the original demodulation path in block 456. From block 456 the cycle continues back to block 450.

FIGS. 9A–9D develop the method of FIG. 8 with added detail. This exemplary flow chart assumes a system having four demodulation elements and eight searcher elements. The method developed is according to the present invention as a preferred embodiment. In this implementation the number of re-assignments has been limited to two per cycle. Other maximum numbers could be chosen without deviating from the teachings of the present invention. In addition many other embodiments of the present invention will be readily apparent upon consideration the implementation of FIGS. 9A–9D. Therefore FIGS. 9A–9D are not meant to limit the present invention but are meant to serve as a preferred embodiment.

Figure 9A:
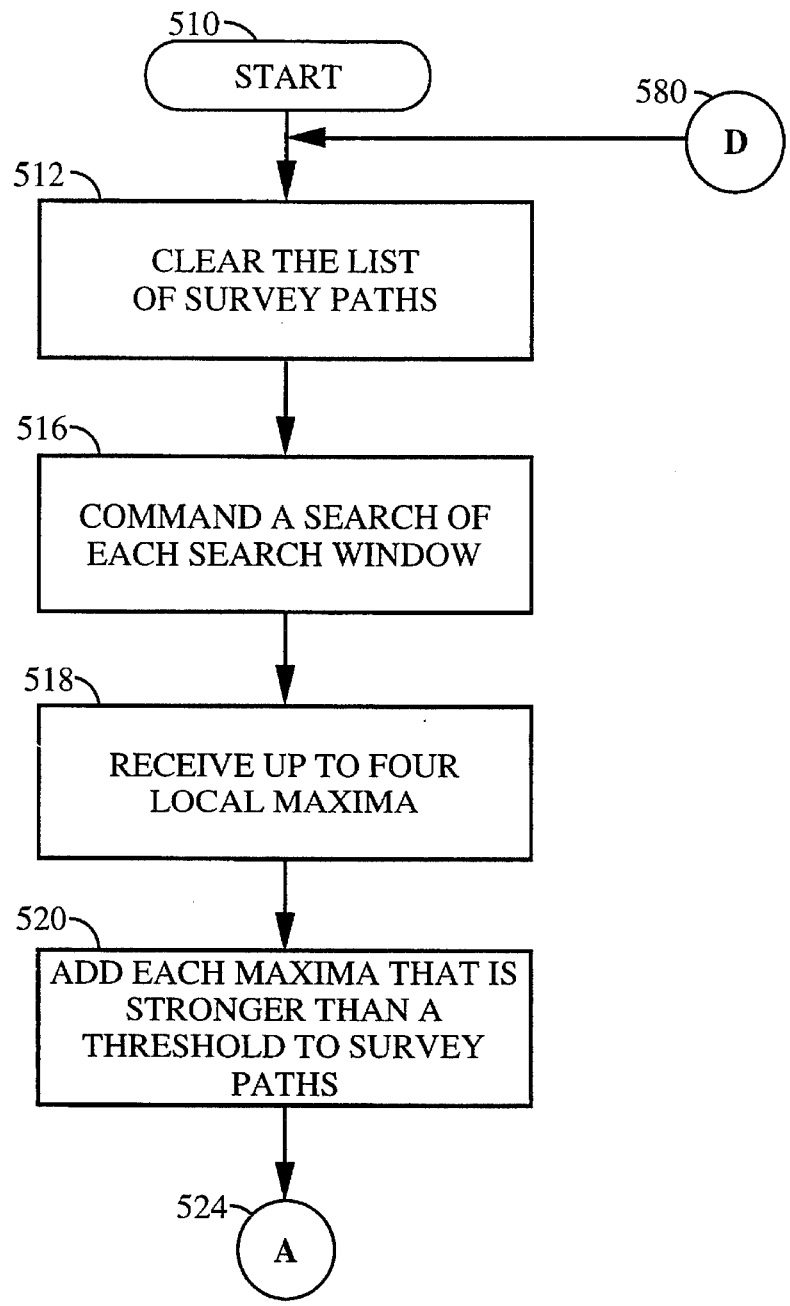
FIGS. 9A–9D are a detailed example of the demodulation element assignment method for a base station according to the present invention.

FIG. 9A begins the cycle and is roughly equivalent to block 450 of FIG. 8. Block 510 indicates the starting function of the method. Block 512 clears the list of survey paths found on the last cycle. Block 516 commands the searcher elements to search a window of time around the expected arrival time of signals from the mobile station with which communication is established. Block 518 receives no more than the four strongest local maxima. In this example, receiving more than the four strongest local maxima is ineffectual because only four demodulation elements are available for assignment and in no case would a demodulation element be assigned to the fifth strongest survey path. Block 520 adds the information of each of the local maxima that exceeds a minimum signal level threshold to the list of survey paths. Block 520 directs the flow to the next portion of the method through connection block 524.

Figure 9B:
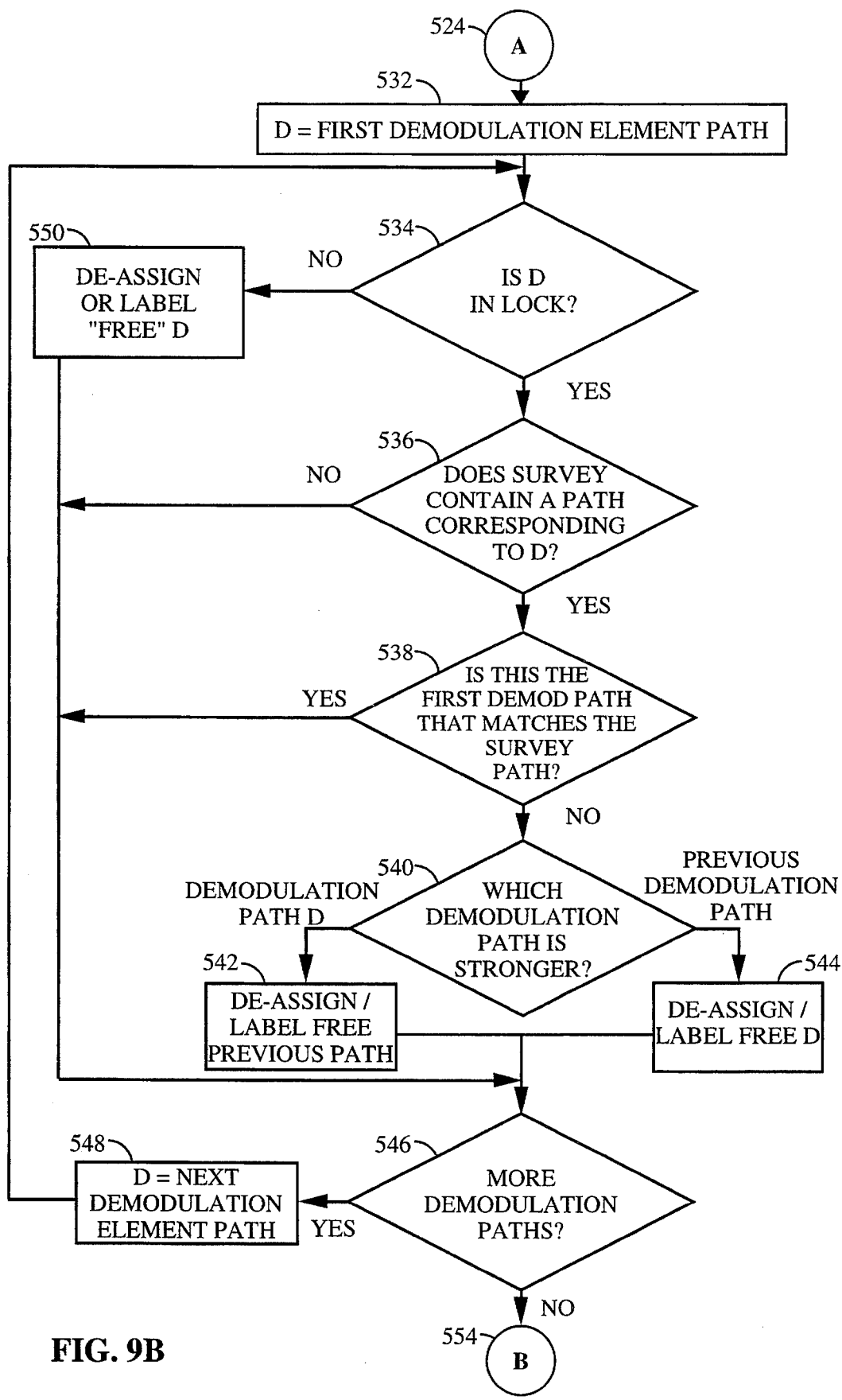

Having attained the set of survey paths, the method continues on FIG. 9B that is roughly equivalent to block 452 of FIG. 8. Connection block 524 directs the flow to block 532. Block 532 sets the demodulation path under consideration to one of the paths that is currently being demodulated by a demodulation element. Block 534 checks the lock/unlock state of the demodulation element corresponding to the demodulation path under consideration. If the demodulation element is unlocked the controller may de-assign the demodulation element or it may label the demodulation element "free" as indicated by block 550. In such a case no valid data exists to match to the survey paths. Action corresponding to the demodulation path under consideration is complete.

If the demodulation element corresponding to the demodulation path under consideration is currently in lock, block 536 attempts to match the time offset of the demodulation path to the analogous information in the list of survey paths. If a survey path exists that corresponds to the demodulation path under consideration, block 538 inquires if the demodulation path under consideration is the first demodulation path to match the particular survey path. If the demodulation path under consideration is the first, action corresponding to the demodulation path under consideration is complete.

If the demodulation path under consideration is not the first demodulation path to match the particular survey path, two demodulation elements are demodulating substantially the same path. This scenario can be a common occurrence. Each demodulation element tracks the signal to which it was originally assigned. Two multipath signals over time may merge into one path or nearly the same path. Block 538 identifies such a situation. If the demodulation path under consideration is not the first demodulation path to match a particular survey path, Block 540 determines which demodulation path has the stronger signal level. If the demodulation element under consideration has the stronger signal level, block 542 de-assigns or labels free the previous demodulation element matching this same survey path. If the demodulation element under consideration is weaker than the previous path, block 544 de-assigns or labels free the demodulation element corresponding to the demodulation path under consideration. Action corresponding to the demodulation path under consideration is complete.

If a demodulation path exists that has not yet been considered, block 546 directs the method to block 548. Block 548 selects the next demodulation path under consideration and block 534 begins to repeat the process for the next demodulation path under consideration. If the demodulation path under consideration is the last demodulation path to be matched, block 546 directs the flow to the next portion of the method though connection block 554.

Figure 9C:
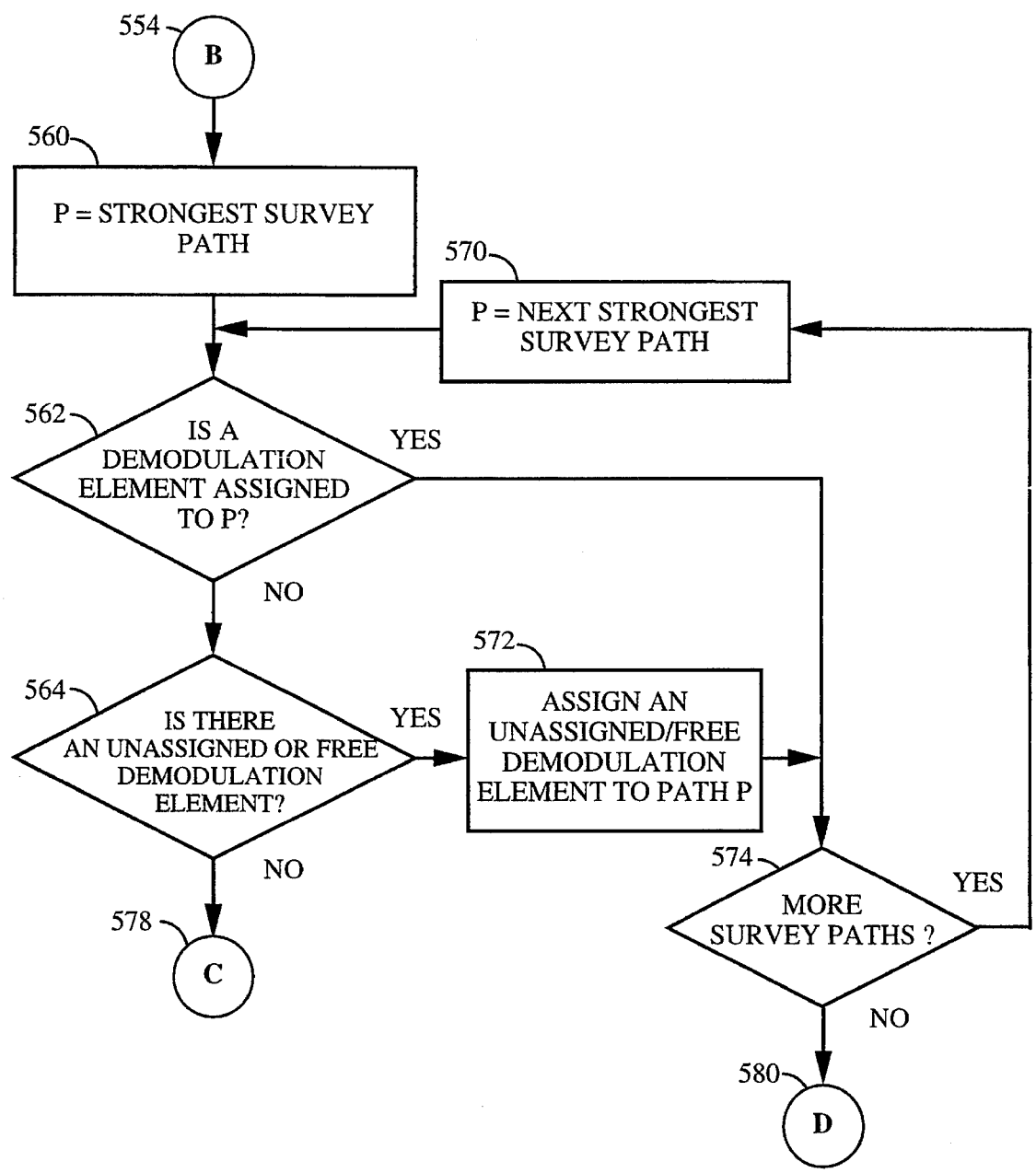

Having attained the set of survey paths and matched the demodulation paths to the survey paths, the method continues on FIG. 9C that is roughly equivalent to block 454 of FIG. 8. Connection block 554 directs the flow to block 560. Block 560 sets the survey path under consideration to the survey path with the strongest signal level.

Block 562 inquires whether a demodulation element is assigned to demodulate the survey path under consideration. If so, action corresponding to the survey path under consideration is complete. If there is no demodulation element assigned to the survey path under consideration, flow continues to block 564. Block 564 asks if any demodulation element is unassigned or free. If an unassigned or free demodulation element exists, block 572 assigns the unassigned or free demodulation element to the survey path under consideration and action corresponding to the survey path under consideration is complete.

The process of FIG. 9C continues from block 562 and from block 572 to block 574. Block 574 inquires whether a remaining survey path exists. If a remaining survey path exists, block 570 chooses the next strongest survey path to be the survey path under consideration and the flow continues through block 562. If an additional survey path does not exist, meaning that the number of demodulation elements is greater than or equal to the number of survey paths found, the flow continues through connection block 580 to FIG. 9A and the cycle begins again. In contrast if more survey paths than demodulation elements exist, the flow continues to step through the survey paths until no unassigned or free demodulation element exists. Continuing from block 564, the flow continues through connection block 578 to FIG. 9D.

Figure 9D:
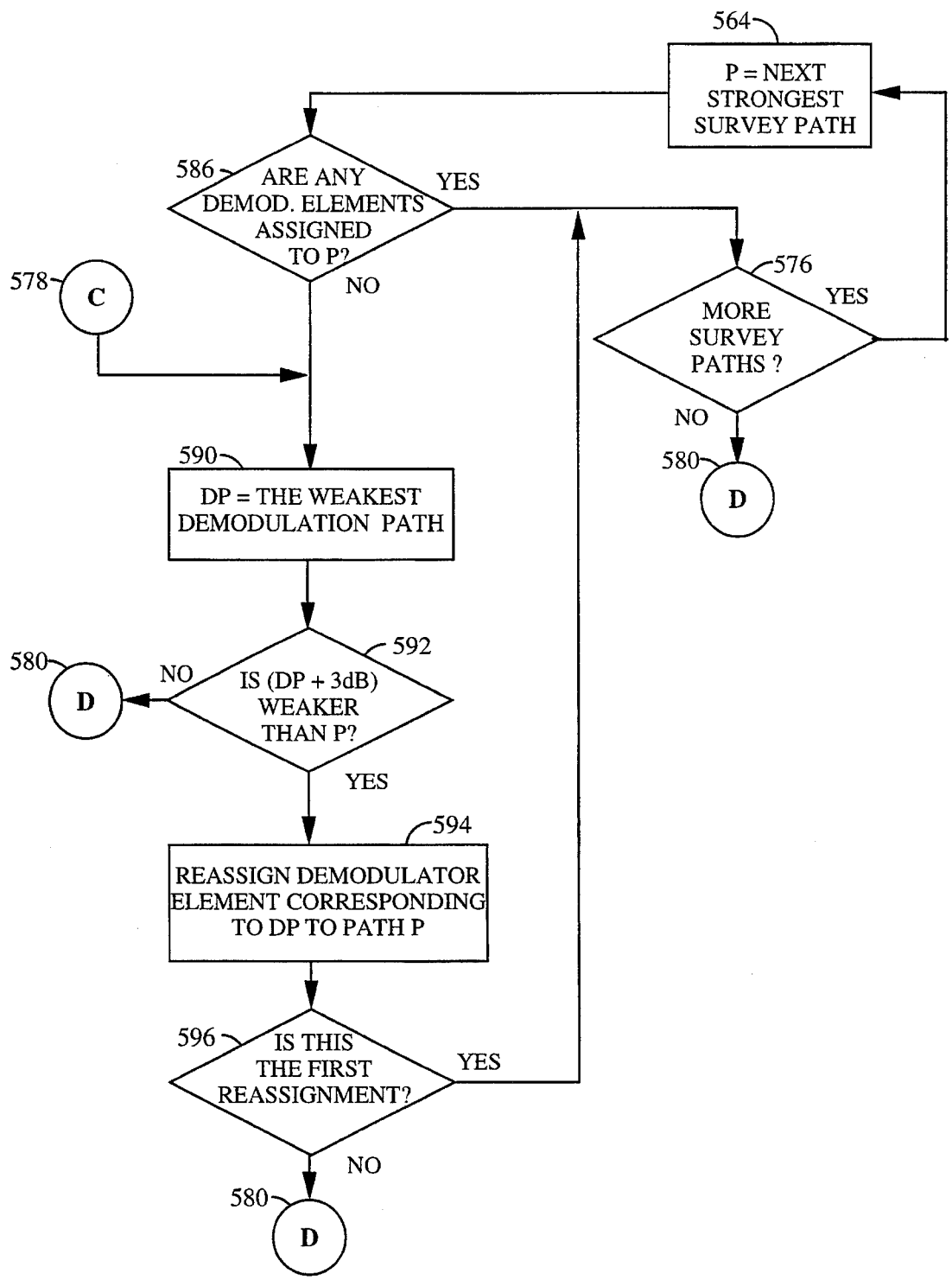

The method continues on FIG. 9D, which is roughly equivalent to block 456 of FIG. 8. Connection block 578 directs the flow to block 590 from FIG. 9C. The survey path under consideration in FIG. 9C when connection block 578 is reached is still the survey path under consideration as FIG. 9D is begun.

Block 590 selects the weakest demodulation path for comparison with the survey path under consideration. Block 592 inquires if the signal level of the demodulation path for comparison is more than 3 dB weaker than the signal level of the survey path under consideration. The 3 dB difference is a hysteresis window to prevent excessive re-assignment between two similarly advantageous paths. Larger or smaller hysteresis windows could be used depending on the system application. If the survey path signal level is not at least 3 dB larger than the demodulation path for comparison, the cycle begins over as indicated by connection block 580. If the survey path signal level is at least 3 dB larger than the demodulation path for comparison, the demodulation element corresponding to the demodulation path for comparison is re-assigned to the survey path under consideration as indicated by block 594. Because this re-assignment is the first re-assignment for this cycle, flow continues to block 576. If block 596 is reached a second time, the maximum number of re-assignments for this cycle have occurred and the cycle begins again with FIG. 9A as indicated by connection block 580.

Block 576 asks if any more survey paths exist. If another survey path exists, block 564 sets the survey path with the next highest signal level to be the survey path under consideration. Block 586 inquires if a demodulation element is assigned to the survey path under consideration. The process continues accordingly to block 590 or block 576. If the survey path under consideration is the last survey path to be considered, the flow continues though connection block 580, beginning a new cycle on FIG. 9A.

Figure 10A:
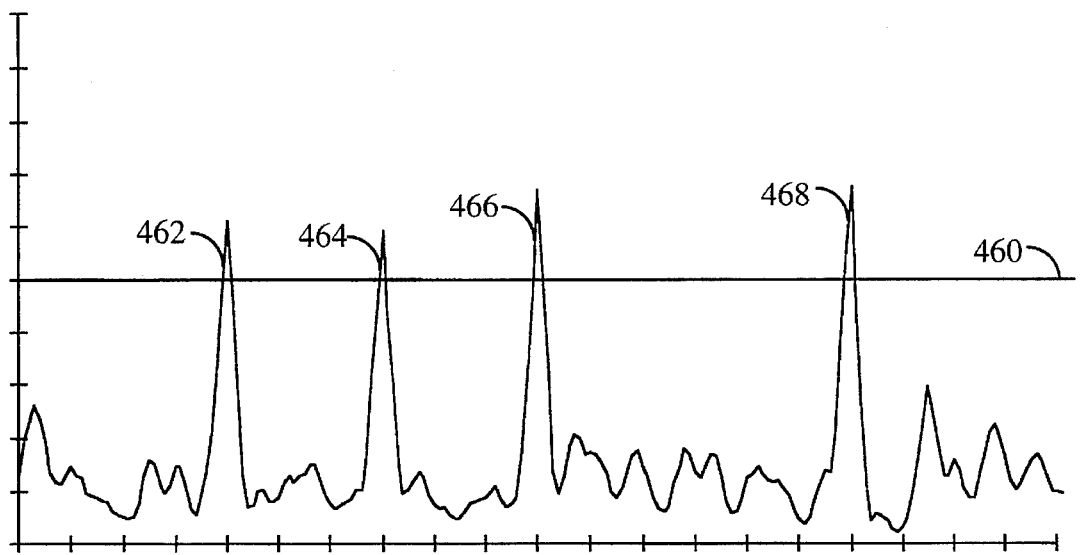
FIGS. 10A and 10B illustrate the signal strength of a single mobile station versus time for two different base station sectors.
Figure 10B:
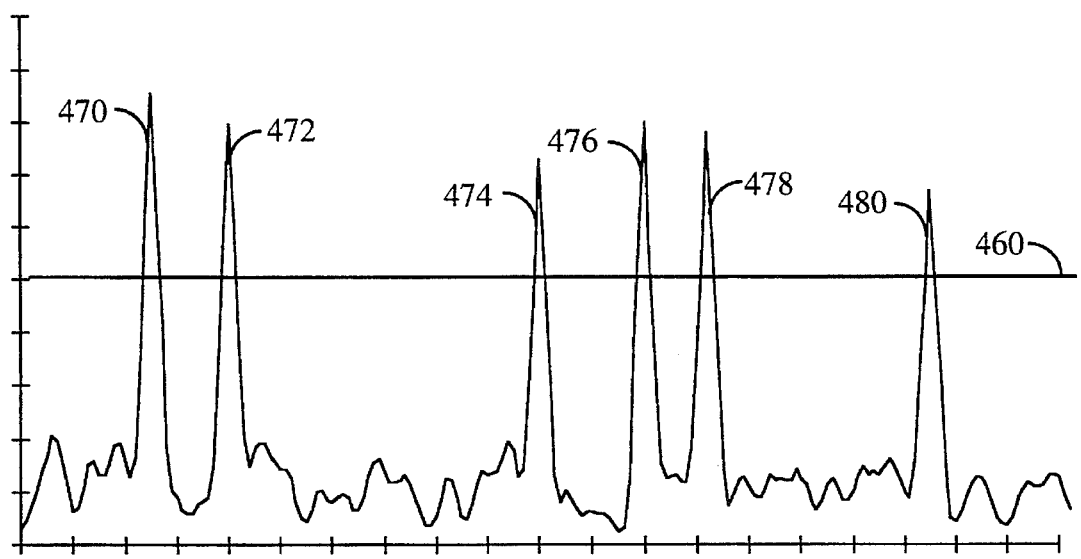

FIGS. 10A and 10B illustrate an exemplary format to view the components of the input signal from a single mobile station. In general, a many of signals are present at each antenna from a plurality of mobile stations in and near the system. FIGS. 10A and 10B show only the signal from a single mobile station with which communication is established. FIG. 10A illustrates the signal strength versus time for the mobile station received at a first base station sector. FIG. 10B illustrates the signal strength versus time for the same mobile station received at a second base station sector. In FIGS. 10A and 10B, the horizontal axis has units of time and the vertical axis has units of energy in dB. In FIG. 10A, four paths are higher than the noise floor and are labeled paths 462, 464, 466, and 468. Path 462 arrives first in time and can be assumed to be the most direct path available from the mobile station to the base station. Paths 464, 466, and 468 follow sequentially in time and are multipath signals of the same signal as path 462. Line 460 represents a threshold below which the signal strength does not produce reliable data.

The time offset between the sector of FIG. 10A and the sector of FIG. 10B is not explicitly shown. FIG. 10B can be thought of as normalized to the delay of FIG. 10A for the purposes of illustration. In FIG. 10B, six paths are higher than the noise floor and are labeled paths 470, 472, 474, 476, 478, and 480. Again line 460 represents a threshold below which the signal strength does not produce reliable data.

By way of example let us assume that the method of FIGS. 9A–9D is executed based on the signals shown in FIGS. 10A and 10B. Assume that the four demodulation elements are assigned as follows:

| Demod. element | Time Offset | Signal Level | Locked | Sector |
| --- | --- | --- | --- | --- |
| 1 | $t_1$ | $A_1$ | Y | 10A |
| 2 | $t_2$ | $A_2$ | Y | 10A |
| 3 | $t_3$ | $A_3$ | Y | 10B |
| 4 | $t_4$ | $A_4$ | Y | 10B | where the sector corresponds to the figure numbers in FIGS. 10A and 10B. The flow begins on FIG. 9A. The survey list is cleared and the searcher elements are assigned to the appropriate sector and commanded to search a window of time (blocks 510–516). The search data is received from each searcher elements and the four strongest local maxima are recorded in descending order of signal strength as follows (blocks 520 and 524):

| Path Label | Time Offset | Signal Level | Sector |
| --- | --- | --- | --- |
| 470 | $t_{10}$ | $A_{10}$ | 10B |
| 476 | $t_{11}$ | $A_{11}$ | 10B |
| 472 | $t_{12}$ | $A_{12}$ | 10B |
| 478 | $t_{13}$ | $A_{13}$ | 10B |

FIG. 9B begins by setting the path of demodulation element 1 to be the first path under consideration. Because demodulation element 1 is locked, an attempt is made to match the demodulation path to a survey path (block 534–536). Suppose in this example that $t_1$ is approximately equal to the arrival time of path 466 of FIG. 10A, which has a relatively low signal strength and so does not have a corresponding entry on the survey path list. The process continues for the next demodulation path (blocks 546).

Demodulation path 2 is set as the demodulation path under consideration (block 548). Because demodulation path 2 is locked, an attempt is made to match the demodulation path to a survey path (block 534–536). Suppose in this example that $t_2$ is approximately equal to the arrival time of path 468 of FIG. 10A, which has a relatively low signal strength and so does not have a corresponding entry on the survey path list. The process continues for the next demodulation path (blocks 546).

Demodulation path 3 is set as the demodulation path under consideration (block 548). Because demodulation path 3 is locked, an attempt is made to match the demodulation path to a survey path (block 534–536). Suppose in this example that $t_3$ corresponds to $t_{10}$ of path 470. Because demodulation path 3 is the first demodulation path to match survey path 470, the process continues for the next demodulation path (blocks 538–546).

Demodulation path 4 is set as the demodulation path under consideration (block 548). Because demodulation path 4 is locked, an attempt is made to match the demodulation path to a survey path (block 534–536). Suppose in this example that $t_4$ is approximately equal to the arrival time of path 480 of FIG. 10A, which has a relatively low signal strength and so does not have a corresponding entry on the survey path list. Because demodulation path 4 is the last demodulation path, the functions of FIG. 5B are complete and we continue to FIG. 5C with the following list of survey paths:

| Path Label | time offset | Signal level | Sector | Matched |
| --- | --- | --- | --- | --- |
| 470 | $t_{10}$ | $A_{10}$ | 10B | Demod path 3 |
| 476 | $t_{11}$ | $A_{11}$ | 10B | None |
| 472 | $t_{12}$ | $A_{12}$ | 10B | None |
| 478 | $t_{13}$ | $A_{13}$ | 10B | None |

Assuming that $A_{10}$ is the strongest signal level, FIG. 9C starts by setting survey path 470 as the survey path under consideration (block 560). In this case demodulation element 3 is assigned to survey path 470 (block 562). Therefore survey path 476 is set as the next survey path under consideration (blocks 574 and 570). Because no demodulation element is assigned to survey path 476 and no unassigned or free demodulation element exists, the flow continues to FIG. 5D (blocks 562, 564, and 578).

Demodulation path 1 (corresponding to path 466 of FIG. 10A) is set to be the demodulation path under consideration because it is the weakest demodulation path (block 590). Supposing that $A_{11}$ is more than 3 dB greater than $A_1$, demodulation element 1 is re-assigned to survey path 476 (blocks 592 and 594). This re-assignment is the first re-assignment of this search cycle and therefore survey path 472, to which no demodulation element is assigned, is set as the next survey path under consideration (blocks 596, 576, 564, and 586).

Demodulation path 2 (corresponding to path 468 of FIG. 10A) is set to be the demodulation path under consideration because it is now the weakest demodulation path (block 590). Supposing that $A_{12}$ is more than 3 dB greater than $A_2$, demodulation element 2 is re-assigned to survey path 472 (blocks 592 and 594). This re-assignment is the second re-assignment of this search cycle, so the flow continues to FIG. 9A to begin another cycle. The list of demodulation element assignments is as follows:

| Demod. Element | Corresponding Path | Locked | Sector |
| --- | --- | --- | --- |
| 1 | 476 | Y | 10B |
| 2 | 472 | Y | 10B |
| 3 | 470 | Y | 10B |
| 4 | 480 | Y | 10B |

An interesting point to note in the results of the base station assignment example above is that all of the demodulation elements are assigned to the same sector even though communication is established through more than one sector. This result contrasts with the result that would come from the mobile station assignment method that stresses sector diversity. It is also interesting to note that the four demodulation elements are not assigned to the four strongest paths as indicated on FIG. 10B. Demodulation element 4 is assigned to path 480 which is the sixth strongest path from sector 10B. However, in the example above, the maximum number of re-assignments per cycle is reached before this demodulation element is compared to a survey path for possible re-assignment. It should be noted that the above method is equally applicable to a base station having only one sector.

There are many obvious variations of the embodiments of this invention. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a receiver having a plurality of demodulation elements, a method of assigning said plurality of demodulation elements to a set of available signals, comprising the steps of:

measuring said available signals and creating electronic representations of a list of survey paths comprised of an arrival time, a signal strength, and a transmitter index of each of said available signals;

matching a list of demodulation paths comprised of an arrival time, a signal strength, and a transmitter index corresponding to signals being demodulated by said receiver to said list of survey paths; and assigning an un-assigned demodulation element, if said un-assigned demodulation element exists, to a particular survey path having a corresponding transmitter index that is different than every transmitter index in said list of demodulation paths.

2. The method of claim 1 wherein, in said step of assigning said un-assigned demodulation element, said particular survey path corresponds to the survey path having strongest signal strength of any survey path having said corresponding transmitter index.

3. The method of claim 1 further comprising the steps of:

re-assigning a particular demodulation element to said particular survey path if no un-assigned demodulation element exists comprising the steps:

un-assigning said particular demodulation element; and assigning said particular demodulation element to said particular survey path.

4. The method of claim 3 wherein said particular demodulation element corresponds to the demodulation path having a signal strength that is weaker than the signal strength of any demodulation element.

5. The method of claim 3 wherein said particular demodulation element corresponds to a demodulation path having a signal strength that is weaker than the signal strength of said particular survey path.

6. The method of claim 3 wherein said particular demodulation element is assigned to a demodulation path having a signal strength that is at least a certain ratio weaker than the signal strength of said particular survey path.

7. The method of claim 3 wherein said particular demodulation element is assigned to a demodulation path having a signal strength that is 3 dB weaker than the signal strength of said particular survey path.

8. The method of claim 3 wherein said particular demodulation element is assigned to a particular demodulation path having a transmitter index which is the same as the transmitter index of at least one other demodulation path.

9. The method of claim 8 wherein said particular demodulation path has the weakest signal strength of any such path in said list of demodulation paths.

10. The method of claim 1 wherein said transmitter index represents a base station.

11. The method of claim 1 wherein said transmitter index represents a sector of a base station.

12. The method of claim 1 wherein each transmitter transmits a spread spectrum signal using pseudo noise modulation and wherein said transmitter index represents the code offset of the transmitted spread spectrum signal.

13. The method of claim 1 wherein said step of matching said list of demodulation paths to said list of survey paths causes each entry in said list of demodulation paths to correspond to an entry in said list of survey paths.

14. The method of claim 1 wherein said step of matching said list of demodulation paths to said list of survey paths comprises the steps of:

matching a first demodulation path having a first signal strength to a first survey path;

matching a second demodulation path having a second signal strength to said first survey path wherein said second signal strength is greater than said first signal strength; and un-assigning a first demodulation element corresponding to said first demodulation path.

15. The method of claim 1, wherein each demodulation element of said plurality of demodulation elements that is assigned to a demodulation path indicates a state of successful or jeopardized demodulation, further comprising the step of un-assigning a particular demodulation element if said particular demodulation element indicates jeopardized demodulation.

16. The method of claim 1, wherein said receiver has at least one searcher element, and wherein said step of conducting a survey of available signals and creating a list of survey paths comprises the steps of:

receiving from said at least one searcher element a local maximum data point having an arrival time, a signal strength, and a transmitter index;

adding said local maximum data point to said list of survey paths if said signal strength of said local maximum data point exceeds a predetermined level.

17. The method of claim 1, wherein said receiver has at least one searcher element, and wherein said step of conducting a survey of available signals and creating a list of survey paths comprises the steps of:

receiving from said at least one searcher element a set of local maximum data points each having an arrival time, a signal strength, and a common transmitter index; and adding a limited number of said local maximum data points to said list of survey paths if signal strength each of said added limited number of local maximum data points exceeds a predetermined level.

18. The method of claim 17, wherein said limited number of said local maximum data points is equal to the number of demodulation elements of said plurality of demodulation elements.

19. The method of claim 1, wherein said step of matching said list of demodulation paths to said list of survey paths further comprises the steps of:

finding a demodulation path that does not match any survey path of said list of survey paths; and adding an entry in said list of survey paths corresponding to said unmatched demodulation path.

20. The method of claim 1, wherein each transmitter index in said list of survey paths is the same as a transmitter index in said list of demodulation paths, further comprising the step of assigning an un-assigned demodulation element, if said un-assigned demodulation element exists, to a second particular survey path.

21. The method of claim 20 wherein, in said step of assigning said un-assigned demodulation element, said second particular survey path does not have the same arrival time and transmitter index of any demodulation path on said list of demodulation paths.

22. The method of claim 21 wherein said second particular survey path has the strongest signal strength of any such path.

23. The method of claim 1 further comprising the steps of:

re-assigning a particular demodulation element comprising the steps of:

un-assigning said particular demodulation element assigned to a particular demodulation path; and assigning said particular demodulation element to a second particular survey path.

24. The method of claim 23 wherein said particular demodulation path has the same transmitter index as said second particular survey path.

25. The method of claim 24 wherein said particular demodulation path has a signal strength that is weaker than the signal strength of said second particular survey path.

26. The method of claim 24 wherein said particular demodulation path has a signal strength that is at least a certain ratio weaker than the signal strength of said second particular survey path.

27. The method of claim 24 wherein said particular demodulation path has a signal strength that is 3 dB weaker than the signal strength of said second particular survey path.

28. The method of claim 23 wherein said particular demodulation path has the same transmitter index as at least one other entry on said list of demodulation paths.

29. The method of claim 23 wherein said particular demodulation path has the weakest signal strength of any demodulation path having the same transmitter index as said particular demodulation path.

30. The method of claim 1 wherein said step of matching said list of demodulation paths to said list of survey paths further comprises the step of matching said arrival time of each demodulation path in said list of demodulation paths to an arrival time of a corresponding entry on said survey paths.

31. The method of claim 1 wherein said step of matching said list of demodulation paths to said list of survey paths further comprises the step of matching within a predetermine time offset said arrival time of each demodulation path in said list of demodulation paths to an arrival time of a corresponding entry on said survey paths.

32. The method of claim 1 wherein each transmitter transmits a pseudo noise modulated signal using a pseudo noise code comprised of a sequence of code values and wherein said arrival time corresponds to a code value offset of said pseudo noise code.

33. The method of claim 1 wherein each transmitter transmits a pseudo noise modulated signal using a pseudo noise code comprised of a sequence of code values and wherein said arrival time corresponds to a window of time around a code value offset of said pseudo noise code.

34. The method of claim 33 wherein each code value of said sequence of code values has a duration and wherein said window of time is one half of said duration.

35. The method of claim 1 wherein each transmitter transmits a common pseudo noise modulated signal using a common pseudo noise code comprised of a sequence of code values and each transmitter transmits at a different time offset than every other of said transmitters and wherein said transmitter index corresponds to said different time offset.

36. The method of claim 1 wherein said step of conducting a survey of said available signals is systematically repeated over time.

37. In a receiver system comprised of a set of receivers, a method of assigning said receivers to a set of existing signals from at least one source:

creating a list of said existing signals, each existing signal of said list of existing signals having a signal strength indication, a time indication, and a corresponding source indication;

comparing said list of said existing signals to a list of signals currently assigned to said receivers, each signal of said list of signals currently assigned to said receivers having a signal strength indication, a time indication, and a corresponding source indication; and assigning said receivers to said existing signals such that a maximum number of different corresponding source indications is present on said list of signals currently assigned to said receivers.

38. The method of claim 37 further comprises the step of re-assigning a receiver such that said maximum number of different corresponding source indications is present on said list of signals currently assigned to said receivers comprising the steps of:

un-assigning a particular receiver; and assigning said particular receiver to one of said existing signals of said list of existing signals.

39. The method of claim 37 wherein the rate of occurrence of said steps of re-assigning is limited over time.

40. The method of claim 37 wherein no more than a predetermined number of said steps of re-assigning occurs for each of said step of creating said list of said existing signals.

41. The method of claim 37 wherein said step of creating said list of said existing signals is systematically repeated over time.

42. The method of claim 37 wherein said step of creating said list of said existing signals is systematically repeated over time.

43. The method of claim 37 further comprising the step of making available a first receiver assigned to a first signal wherein a signal strength indication of said first signal is below a predetermined level.

44. The method of claim 43 wherein said available receiver becomes idle.

45. The method of claim 43 wherein said available receiver continues to receive said first signal.

46. The method of claim 43 wherein said available receiver may be assigned a particular existing signal in said step of assigning said receivers to existing signals.

47. The method of claim 37 further comprising the step of making available a first receiver assigned to a first signal wherein the corresponding signal strength indication of said first signal is below a predetermined level for a predetermined period of time.

48. The method of claim 47 wherein said available receiver is idle.

49. The method of claim 47 wherein said available receiver continues to receive said first signal.

50. The method of claim 47 wherein said available receiver may be assigned a particular existing signal in said step of assigning said receivers to existing signals.

51. The method of claim 37 wherein said signal strength indication of said signals assigned to said receivers is generated from an RSSI output on said receivers.

52. The method of claim 51 wherein said RSSI output on said receivers is measured repetitively.

53. The method of claim 37 further comprising the step of making available a first receiver assigned to a first signal wherein the corresponding signal strength indication of said first signal is below a predetermined level for a predetermined number of said measurements.

54. An apparatus for demodulating a signal comprising:

a set of demodulation elements for demodulating a first set of instances of said signal arriving at said apparatus via a set of survey paths, each instance of said signal having an arrival time, signal strength, and transmitter index;

a searcher for determining a second set of instances of said signal arriving at said apparatus, and a corresponding arrival time, signal strength, and transmitter index for each instance;

a control system for matching said first set of instances of said signal with said second set of instances of said signal, and for assigning an un-assigned demodulation element, if said un-assigned demodulation element exists, to a particular instance of said signal from said second set of instances of said signal, said particular instance having a corresponding transmitter index that is different than every transmitter index from said first set of instances of said of signal.

55. The apparatus of claim 54 wherein said signal strength of said particular instance of said signal is greater than any signal strength of any remaining instances of said signal from said first and second set of instances of said signal.

56. The apparatus of claim 55 wherein said control system:

un-assigns a particular demodulation element if no un-assigned demodulation element exists; and assigns said particular demodulation element to said particular instance of said signal.

57. The method of claim 56 wherein said particular demodulation element was assigned to an instance of said signal having a signal strength that is weaker than the signal strength of any other instance of said signal from said first set of instances of said signal.

58. The method of claim 57 wherein said particular demodulation element corresponds to an instance of said signal having a signal strength that is weaker than said signal strength of said particular instance of said signal.

59. A method for processing a signal during a code division multiple access forward link transmission comprising the steps of:

(a) measuring a series of energy levels of said signal;

(b) generating a series of electronic representations of said signal based on said series of energy levels;

(c) searching said series of electronic representations for a set of forward link signals;

(d) determining a corresponding arrival time, a corresponding signal strength, and a corresponding transmitter for each forward link signal from said set of forward link signals; and (e) demodulating a sub-set of forward link signals that contains at least one forward link signal for each transmitter, said at least one forward link signal having a greater signal strength than a remaining set of all other forward link signals also associated with said transmitter.

\* \* \* \* \*